United States Patent
Sohail et al.

(10) Patent No.: US 11,767,331 B2
(45) Date of Patent: Sep. 26, 2023

(54) WATER STABLE ZINC-BASED METAL ORGANIC FRAMEWORK AND METHOD OF USE

(71) Applicant: King Fahd University of Petroleum and Minerals, Dhahran (SA)

(72) Inventors: Manzar Sohail, Dhahran (SA); Muhammad Altaf, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 1117 days.

(21) Appl. No.: 16/394,389

(22) Filed: Apr. 25, 2019

(65) Prior Publication Data

US 2020/0190114 A1 Jun. 18, 2020

Related U.S. Application Data

(60) Provisional application No. 62/781,127, filed on Dec. 18, 2018.

(51) Int. Cl.

| | |
|---|---|
| *C07F 3/06* | (2006.01) |
| *B01J 35/00* | (2006.01) |
| *B01J 31/12* | (2006.01) |
| *C25B 1/04* | (2021.01) |
| *C25B 1/55* | (2021.01) |
| *C25B 11/00* | (2021.01) |
| *C25B 11/055* | (2021.01) |
| *C25B 11/073* | (2021.01) |
| *C07F 3/00* | (2006.01) |

(52) U.S. Cl.
CPC .............. *C07F 3/06* (2013.01); *B01J 31/12* (2013.01); *B01J 35/004* (2013.01); *C07F 3/003* (2013.01); *C25B 1/04* (2013.01); *C25B 1/55* (2021.01); *C25B 11/00* (2013.01); *C25B 11/055* (2021.01); *C25B 11/073* (2021.01); *B01J 2531/004* (2013.01); *B01J 2531/0241* (2013.01); *B01J 2531/26* (2013.01)

(58) Field of Classification Search
CPC ............ B01D 2253/204; B01J 31/1691; B01J 20/226; B01J 31/069; B01J 31/123; C07C 51/418; C07F 3/06; C07F 3/003
See application file for complete search history.

(56) References Cited

U.S. PATENT DOCUMENTS

| | | |
|---|---|---|
| 7,968,739 B2 | 6/2011 | Mueller et al. |
| 9,352,489 B2 | 5/2016 | Maspoch Comamala et al. |
| 2015/0238930 A1* | 8/2015 | Said ............... B01J 20/226 |
| | | 502/401 |
| 2017/0182486 A1 | 6/2017 | Lin et al. |
| 2018/0024058 A1 | 1/2018 | Kim et al. |

FOREIGN PATENT DOCUMENTS

| | | | |
|---|---|---|---|
| CN | 105032489 A | 11/2015 | |
| WO | 2013/058845 A1 | 4/2013 | |
| WO | WO-2020068996 A1 * | 4/2020 | ............ B01J 20/226 |

OTHER PUBLICATIONS

Y. Wen et al., 29 Advanced Materials, (2017) (Year: 2017).*
X. Lin et al., 7 Chemistry, An Asian Journal, 2796-2804 (2012) (Year: 2012).*
Compendium of Chemical Terminology, p. 73 (the "Gold Book") (2019) (Year: 2019).*
M. Altaf et al., 11 ChemSusChem, 542-546 (2018) (Year: 2018).*
M. Sohail et al., 42 New Journal of Chemistry, 12486-12491 (2018) (Year: 2018).*
S. Huang et al., 44 Inorganic Chemistry Communications, 29-31 (2014) (Year: 2014).*
B. Deibert et al., 21 Chemistry a European Journal (2015) (Year: 2015).*
Altaf, et al.; Synthesis, Characterization, and Photoelectrochemical Catalytic Studies of a Water-Stable Zinc-Based Metal-Organic Framework; Chemistry & Sustainability 11; pp. 542-546; Dec. 18, 2017; 5 Pages.
Tao Z, et al.; MOF-Derived Noble Metal Free Catalysts for Electrochemical Water Splitting; ACS Appl Mater Interfaces 8(51); pp. 35390-35397; Dec. 28, 2016; 1 Page; Abstract Only.
Dhakshinamoorthy, et al.; Metal-Organic Framework (MOF) Compounds: Photocatalysts for Redox Reactions and Solar Fuel Production; Angewandte Chemie; Mar. 11, 2016; 2 Pages; Abstract Only.
Nazari, et al.; A Zn based metal organic framework nanocomposite: synthesis, characterization and application for preconcentration of cadmium prior to its determination by FAAS†; Royal Society of Chemistry 7; Sep. 12, 2017; 6 Pages.
Tan, et al.; Water Reaction Mechanism in Metal Organic Frameworks with Coordinatively Unsaturated Metal Ions: MOF-74; 34 Pages.
Liu, et al.; Construction of Four Zn(II) Coordination Polymers Used as Catalysts for the Photodegradation of Organic Dyes in Water; MDPI Polymers; Jan. 6, 2016; 13 Pages.

* cited by examiner

*Primary Examiner* — Alexander R Pagano
(74) *Attorney, Agent, or Firm* — Oblon, McClelland, Maier & Neustadt, L.L.P.

(57) ABSTRACT

A zinc-based metal organic framework and method of making is described. The zinc-based metal organic framework is in the form of an interpenetrating diamondoid framework where each $Zn^{2+}$ ion center is linked with four other $Zn^{2+}$ ion centers in a distorted tetrahedral geometry. The linking occurs through diamine and dicarboxylic acid linkers. The zinc-based metal organic framework may be deposited on a transparent conducting film and used as a photoelectrode for photoelectrochemical water splitting.

13 Claims, 11 Drawing Sheets

WATER STABLE ZINC-BASED METAL ORGANIC FRAMEWORK AND METHOD OF USE

CROSS REFERENCE TO RELATED APPLICATIONS

This application claims the benefit of priority from U.S. Provisional Application No. 62/781,127 filed Dec. 18, 2018, which is incorporated herein by reference in its entirety.

STATEMENT REGARDING PRIOR DISCLOSURES BY THE INVENTORS

Aspects of this technology are described in an article "Synthesis, Characterization, and Photoelectrochemical Catalytic Studies of a Water-Stable Zinc-Based Metal-Organic Framework" by Muhammad Altaf, Manzar Sohail, Muhammad Mansha, Naseer Iqbal, Muhammad Sher, Atif Fazal, Nisar Ullah, and Anvarhusein A. Isab, in ChemSusChem 2018, 11, 542, DOI: 10.1002/cssc.201702122, which is incorporated herein by reference in its entirety.

BACKGROUND OF THE INVENTION

Technical Field

The present invention relates to a zinc based metal organic framework, method of making, and method of using for photoelectrochemical water splitting.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The development of suitable methods for obtaining and utilizing alternative energy from renewable resources is one of the essential tasks for the future of mankind. See H. B. Wu, B. Y. Xia, L. Yu, X.-Y. Yu, X. W. Lou, Nat. Commun. 2015, 6, 6512, incorporated herein by reference in its entirety. Presently, fossil fuels are the main source to meet the energy demands of humans at an affordable cost. See J.-R. Li, Y. Ma, M. C. McCarthy, J. Sculley, J. Yu, H.-K. Jeong, P. B. Balbuena, H.-C. Zhou, Coord. Chem. Rev. 2011, 255, 1791-1823, incorporated herein by reference in its entirety. However, limited reservoirs and estimated exhaust of fossil fuels along with detrimental usage of these fuels to environment have spurred interest to look for alternative energy sources. See aI. S. Nashawi, A. Malallah, M. Al-Bisharah, Energy & Fuels 2010, 24, 1788-1800; bN. Armaroli, V. Balzani, Angew. Chem. Int. Ed. 2007, 46, 52-66; cM. Fontecave, Angew. Chem. Int. Ed. 2015, 54, 6946-6947, incorporated herein by reference in its entirety. In this regard, solar energy and water are consider to be the most sustainable and renewable resources. However, the utilization of these "noble" resources continues to be challenging. See aT. R. Cook, D. K. Dogutan, S. Y. Reece, Y. Surendranath, T. S. Teets, D. G. Nocera, Chem. Rev. 2010, 110, 6474-6502; bM. G. Walter, E. L. Warren, J. R. McKone, S. W. Boettcher, Q. Mi, E. A. Santori, N. S. Lewis, Chem. Rev. 2010, 110, 6446-6473, incorporated herein by reference in its entirety. A key step in harnessing solar energy is its conversion into useful chemical energy. Thus, efficient $H_2$ generation by solar water splitting constitute promising way to utilize/store energy. See Q. Liu, J. Tian, W. Cui, P. Jiang, N. Cheng, A. M. Asiri, X. Sun, Angew. Chem. 2014, 126, 6828-6832, incorporated herein by reference in its entirety. Over the last decade, intensive research efforts have been devoted to $H_2$ generation by water splitting. See S. Rajaambal, K. Sivaranjani, C. S. Gopinath, J. Chem. Sci. 2015, 127, 33-47, incorporated herein by reference in its entirety. Among these, the photo electrochemical (PEC) approach has emerged as the resourceful technology for achieving sustainable generation of $H_2$ fuel production from water. See X. Yang, A.-Y. Lu, Y. Zhu, M. N. Hedhili, S. Min, K.-W. Huang, Y. Han, L.-J. Li, Nano Energy 2015, 15, 634-641, incorporated herein by reference in its entirety. For this challenging process, the development of semiconductor materials with tunable band gaps is highly important. See W. S. Choi, M. F. Chisholm, D. J. Singh, T. Choi, G. E. Jellison Jr, H. N. Lee, Nat. Commun. 2012, 3, 689, incorporated herein by reference in its entirety. For this purpose, various mixed metal composite semiconductors are suitable because their band gaps can be easily tuned to generate electrons in the conduction band and holes in the valence band upon sunlight illumination. See V. Subramanian, E. Wolf, P. V. Kamat, J. Phys. Chem. B 2001, 105, 11439-11446, incorporated herein by reference in its entirety. In order to get sufficient activity, the fast recombination of electrons and holes needs to be limited so that the electrons and holes have sufficient time to migrate to the surface of the catalysts and participate in the redox reactions to generate $H_2$ from water. See aM. Reza Gholipour, C.-T. Dinh, F. Beland, T.-O. Do, Nanoscale 2015, 7, 8187-8208; bT. Zhang, W. Lin, Chem. Soc. Rev. 2014, 43, 5982-5993, incorporated herein by reference in its entirety. Although efforts have been made on photo-catalysts for sunlight assisted water splitting, challenges remain. In this regard, metal organic frameworks are a suitable choice due to their various structural modes.

The chemistry of metal organic frameworks (MOFs) has evolved significantly over the last few years. MOFs possess highly ordered structures with significantly high surface areas. These materials, built from metal ions and organic linkers, produce desirable structures that can facilitate catalytic centers and light harvesting components in a single compound. See aC. Gomes Silva, I. Luz, F. X. Llabrés Xamena, A. Corma, H. Garcia, Chemistry—A European Journal 2010, 16, 11133-11138; bD. Sheberla, J. C. Bachman, J. S. Elias, C.-J. Sun, Y. Shao-Horn, M. Dincă, Nat. Mater. 2016, 16, 220, incorporated herein by reference in its entirety. In general, most of the MOFs are insulators and are used only as a high surface area support for metal-based semiconducting nanostructured catalytic centers. Some MOFs are used as co-catalysts alongside dyes or composite semiconductors to promote kinetic processes and diminish electron/hole recombination. See S. Wang, X. Wang, Small 2015, 11, 3097-3112, incorporated herein by reference in its entirety. Recent studies show that MOFs applied as a co-material supported on $TiO_2$ for light harvesting may significantly enhance visible light water-splitting activity of the $TiO_2$ photocatalyst. See L. Zhang, P. Cui, H. Yang, J. Chen, F. Xiao, Y. Guo, Y. Liu, W. Zhang, F. Huo, B. Liu, Adv. Sci. 2016, 3, 1500243-n/a, incorporated herein by reference in its entirety. In contrast to this, MOFs can also be used directly as photo- or photo-electro-catalysts. See S. Wang et al. (2015); and K. Meyer, M. Ranocchiari, J. A. van Bokhoven, Energy Environ. Sci. 2015, 8, 1923-1937, each incorporated herein by reference in their entirety. Notably, MOFs act as heterogeneous and homogeneous catalysts as well as semiconducting materials based on inorganic metal and organic linker moieties. In fact, band gaps of MOFs may be easily modulated by introducing different functional groups on the linkers. Thus, MOFs are rapidly finding their place in a diverse range of fields including electronics (termed as MOFtronics), lithium ion batteries, supercapacitors, and dye-sensitized solar cells. See Z. Xie, W. Xu, X. Cui, Y. Wang, ChemSusChem 2017, 10, 1645-1663, incorporated herein by reference in its entirety. However, the design of MOFs for PEC applications remains challenging and hence only few reports are known on the direct utilization of these materials in PECs. See K. Myer et al. (2015).

In order to split water, a semiconducting photocatalyst should have a valence band with a potential more positive than that of the $H_2O/O_2$ couple (1.23 eV) and a conduction band with potential more negative than that of the $H_2O/H_2$ couple (0.00 eV). In the case of MOFs, the height of valence band can be manipulated by introducing different functionalities on the organic linker, and the conduction band level depends on the coordination mode of the metal center. In general, solar light reaching the Earth consists of 47% visible light and only 2% UV light. Thus, an efficient solar light sensitizing semiconducting MOF should be responsive within the visible light range (400-700 nm) and should have an efficient valence and conduction band separation to allow enough time for charge transfer from linker to cluster. A band gap smaller than 3.0 eV is required for an active visible light photocatalyst.

The development of MOFs provides an opportunity to decorate hierarchically-ordered light harvesting catalytic centers within the same molecule, enabling direct utilization of sunlight for useful chemical reactions. In this regard, MOFs and MOF-supported photocatalysts are reported for the $H_2$ evolution half-reaction. See K. Meyer et al. (2015); and M. Xu, L. Han, Y. Han, Y. Yu, J. Zhai, S. Dong, *J. Mater. Chem. A* 2015, 3, 21471-21477, each incorporated herein by reference in their entirety. However, very few works are known for the more challenging and energy demanding oxygen evolution half-reaction. This is mainly due to the instability and diminished catalytic activity in reaction media required for the oxygen evolution reaction. The demand of strong oxidizing agents, complimentary sacrificial agents, and control of pH makes it tedious to use MOFs for these applications. Previously, nanocomposites were developed for water oxidation by doping Ir- and Mn-based photo-catalysts in relatively stable MOFs (UIO-67 and Zr-MOFs) for Ce(IV)-driven water oxidation. However, in these cases, catalytic activity was diminished and long-term stability remained an issue. See R. E. Hansen, S. Das, *Energy Environ. Sci.* 2014, 7, 317-322, incorporated herein by reference in its entirety. In addition, electro-catalytic water oxidation with Cobalt MOFs was reported; but authors inferred that catalytic activity might be due to the cobalt oxide nanoparticles originated by the decomposition of Co-MOFs, rather than intrinsic activity of MOFs. See aY. Gong, H.-F. Shi, P.-G. Jiang, W. Hua, J.-H. Lin, *Cryst. Growth Des.* 2014, 14, 649-657; bY. Gong, Z. Hao, J. Meng, H. Shi, P. Jiang, M. Zhang, J. Lin, *ChemPlusChem* 2014, 79, 266-277, incorporated herein by reference in its entirety. Next, encapsulation of $TiO_2$ nanoparticles was reported within titanium derived MIL-125, MIL125-$NH_2$, MIL-125 $(NH_2)_{1,2}$ MOFs. These $TiO_2$/Ti-MOF hybrid nanocomposites were mounted on FTO and used as photoanodes. To further enhance the PEC activity, gold NPs were decorated on the MOF network. The resulting Au@$TiO_2$/MOF nanocomposite product PEC current of 30 $\mu A \cdot cm^{-2}$ which is comparable to many semiconducting nanostructures reported. See L. Zhang et al. (2016). Nevertheless, the development of Earth abundant metal-based MOFs is highly important for cost effective photoelectrochemical water oxidation.

In view of the foregoing, one objective of the present invention is to provide a new zinc-based MOF as a photoanode in a PEC cell for water oxidation. The MOF is directly used for the oxygen evolution reaction without any oxidants in the electrolyte solution. The MOF material acts as both photoelectro-catalyst and oxidant for water-splitting.

BRIEF SUMMARY OF THE INVENTION

According to a first aspect, the present disclosure relates to a zinc-based metal organic framework (Zn-MOF). The Zn-MOF is made of $Zn^{2+}$ ion centers. Each $Zn^{2+}$ is coordinated in a distorted tetrahedral geometry with a total of four linkers. These four linkers comprise two diamine linkers and two dicarboxylic acid linkers. The diamine linkers each have two aromatic heterocyclic groups where each aromatic heterocyclic group independently comprises 1-5 amines. Each $Zn^{2+}$ ion center is linked to each diamine linker through a N atom and linked to each dicarboxylic acid linker through a carboxylic acid group.

In one embodiment, the $Zn^{2+}$ centers are linked together by the linkers in a diamondoid framework.

In a further embodiment, the Zn-MOF has a five-fold interpenetrating diamondoid framework.

In one embodiment, the aromatic heterocyclic groups define planes that are substantially parallel with each other.

In one embodiment, an average Zn—Zn spacing across either linker is in a range of 10-18 Å.

In one embodiment, an average Zn bond angle is in a range of 105-115°.

In one embodiment, the Zn-MOF has an ultraviolet visible absorption with an absorbance maximum in a range of 280-400 nm.

In one embodiment, the Zn-MOF has a monoclinic crystal system with a C2/c space group.

In one embodiment, the diamine linker is N,N'-bis(pyridin-3-ylmethylene)cyclohexane-1,4-diamine.

In one embodiment, the cyclohexane group of the diamine linker is in chair conformation.

In one embodiment, the dicarboxylic acid linker is 1,4-benzene dicarboxylic acid.

According to a second aspect, the present disclosure relates to a method of making the Zn-MOF of the first aspect of the disclosure. The method comprises the steps of mixing a $Zn^{2+}$ source, the linkers, an organic solvent, and water to produce a mixture. The mixture is heated to produce a precipitate. The precipitate is dried to produce the Zn-MOF.

In one embodiment, a molar ratio of Zn to either linker in the mixture is in a range of 1:1.5-2:1.

In one embodiment, the Zn is present in the mixture at a concentration in a range of 0.05-0.5 M.

According to a third aspect, the present disclosure relates to a photoelectrochemical cell. The photoelectrochemical cell has a photoelectrode comprising the Zn-MOF of the first aspect of the disclosure deposited on a metal oxide conducting substrate, a counter electrode, and an aqueous electrolyte solution in contact with both electrodes.

In one embodiment, the photoelectrode has a current density of 15-40 $\mu A/cm^2$ when the electrodes are subjected to a bias potential of 0.05-1.0 V and an illumination of 80-150 $mW/cm^2$.

In one embodiment, the Zn-MOF is in the form of particles having an average diameter in a range of 500 nm-500 μm.

In one embodiment, the photoelectrochemical cell does not comprise a sacrificial oxidant.

In one embodiment, the aqueous electrolyte solution comprises an electrolyte at a concentration of 0.1-1.0 M.

According to a fourth aspect, the present disclosure relates to a method of photoelectrochemical water splitting. This method involves irradiating the electrochemical cell of the third aspect of the disclosure with sunlight.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
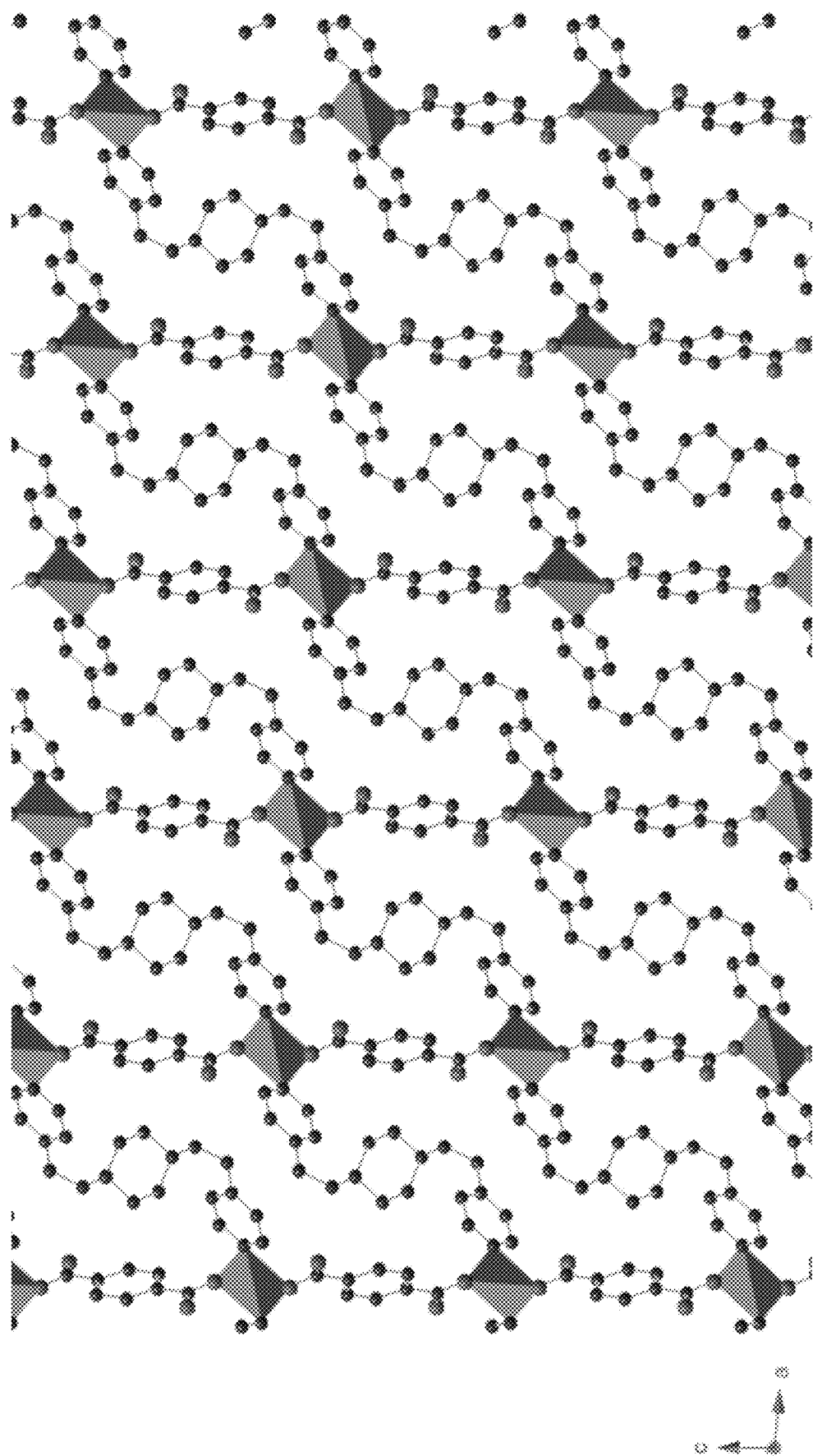
FIG. 1 is a polyhedral view of the 3D framework along the c axis.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, Zn(NO$_3$)$_2$ includes anhydrous Zn(NO$_3$)$_2$, Zn(NO$_3$)$_2$·6H$_2$O, and any other hydrated forms or mixtures. CuCl$_2$ includes both anhydrous CuCl$_2$ and CuCl$_2$·2H$_2$O.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}$C and $^{14}$C. Isotopes of nitrogen include $^{14}$N and $^{15}$N. Isotopes of oxygen include $^{16}$O, $^{17}$O, and $^{18}$O. Isotopes of zinc include $^{64}$Zn, $^{66}$Zn, $^{67}$Zn, $^{68}$Zn, and $^{70}$Zn. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As defined here, an electrode is an electrically conductive material comprising a metal and is used to establish electrical contact with a nonmetallic part of a circuit. An "electrically-conductive material" as defined here is a substance with an electrical resistivity of at most 10$^{-6}$ Ω·m, preferably at most 10$^{-7}$ Ω·m, more preferably at most 10$^{-8}$ Ω·m at a temperature of 20-25° C. The electrically-conductive material may comprise platinum-iridium alloy, iridium, titanium, titanium alloy, stainless steel, gold, cobalt alloy, copper, aluminum, tin, iron, and/or some other metal.

For polygonal shapes, the term "diameter", as used herein, and unless otherwise specified, refers to the greatest possible distance measured from a vertex of a polygon through the center of the face to the vertex on the opposite side. For a circle, an oval, an ellipse, and a multilobe, "diameter" refers to the greatest possible distance measured from one point on the shape through the center of the shape to a point directly across from it.

According to a first aspect, the present disclosure relates to a metal organic framework (MOF). As used herein, a metal organic framework (MOF) refers to compounds comprising metal ions or clusters coordinated to organic ligands to form one, two, or three dimensional structures. They are a subclass of coordination polymers and are often porous. The organic ligands included are sometimes referred to as "struts" or "linkers." More formally, a metal organic framework is a coordination network with organic ligands containing potential voids. As used herein, a coordination network is a coordination compound extending, through repeating coordination entities, in one dimension, but with cross-links between two or more individual chains, loops, or spirolinks, or a coordination compound extending through repeating coordination entities in two or three dimensions; and finally a coordination polymer is a coordination compound with repeating coordination entities extending in one, two, or three dimensions. In most cases, the pores are stable during elimination of guest molecules (often solvents) and metal organic frameworks may be used for the storage of gases such as hydrogen and carbon dioxide, gas purification, gas separation, catalysis, sensors, and supercapacitors.

The metal-organic framework described herein comprises metal ion centers which may be an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, the ion may be of any oxidation state $Mt^{+1}$, $M^{+2}$, $M^{+3}$, etc. In one embodiment, the metal ion is an ion of at least one metal selected from the group consisting of Cu, Zn, Fe, Ni, Co, Mn, Cr, Cd, Mg, Ca, and Zr. In a preferred embodiment, the metal is Zn. The metal ion center is preferably $Zn^{2+}$, and the metal organic framework is called a zinc-based metal organic framework, or Zn-MOF.

Generally, metal organic frameworks (MOFs) are composed of two major components, (i) a metal ion or cluster of metal ions and (ii) an organic molecule called a linker. These materials may often be referred to as hybrid organic-inorganic materials. The organic units are typically mono-, di-, tri-, or tetravalent ligands. The choice of metal and linker dictates the structure and properties of the MOF. For example, the metal's coordination preference influences the size and shape of pores by dictating how many linkers can bind to the metal and in which orientation. The linkers must meet certain requirements to form coordination bonds, primarily being multidentate, having at least two donor atoms (i.e. N—, O—, and/or S—) and being neutral or anionic. The structure of the metal organic framework is also affected by the shape, length, and functional groups present in the organic linker.

In the Zn-MOF of the present disclosure, each $Zn^{2+}$ ion center may be coordinated in a distorted tetrahedral geometry with a total of four linkers. Each linker connects two $Zn^{2+}$ ion centers. In this distorted tetrahedral geometry, an average Zn bond angle may be in a range of 105-115°, preferably 106-110°, or about 107.67°. A smallest Zn bond angle may be in a range of 97-103°, preferably 98-102°, and a greatest Zn bond angle may be in a range of 120-128°, preferably 122-126°. As described here, the "distorted tetrahedral geometry" means that each $Zn^{2+}$ is coordinated in a generally tetrahedral shape, but the tetrahedral shape is not a regular tetrahedral shape where each bond angle is 109.5°. In one embodiment, the distorted tetrahedral geometry of the Zn-MOF may result from linkers having different lengths, however, in alternative embodiments, linkers having very similar or exactly similar lengths may be used to result in a Zn-MOF with a tetrahedral geometry and bond angles of 109.5°. In a related embodiment, one type of linker may be used so that the Zn-MOF has a tetrahedral geometry.

In a related embodiment, linkers of different lengths are used in the Zn-MOF. In one embodiment, an average Zn—Zn spacing across either linker is in a range of 10-18 Å, preferably 11-16 Å, more preferably 12-15 Å, or about 14 Å. In one embodiment, a smallest Zn—Zn spacing across a linker may be 8-13 Å, preferably 9-12 Å, and a greatest Zn—Zn spacing across a linker may be 15-20 Å, preferably 16-18 Å.

In one embodiment, the $Zn^{2+}$ ion centers are linked together by the linkers in a diamondoid framework, which is a 3D-framework similar to the way that carbon atoms are bonded in a diamond crystal in a diamond cubic lattice, where each carbon atom is bonded to four other carbons in a tetrahedral geometry. Here, each unit cell of the Zn-MOF framework comprises a total of 8 $Zn^{2+}$ ion centers. The diamondoid framework may be thought of as two interpenetrating face-centered cubic lattices with one lattice displaced by ¼ of the diagonal along a cubic cell, or as one lattice with two atoms associated with each lattice point. In one embodiment, the Zn-MOF has a monoclinic crystal system with a C2/c space group.

In one embodiment, the Zn-MOF comprises interpenetrating diamondoid frameworks, which may be made possible by the relatively large Zn—Zn spacing. Interpenetrating diamondoid frameworks may be considered a type of interpenetrating polymer network (IPN), because the Zn-MOF comprises repeating units of $Zn^{2+}$ ion centers and linkers. An IPN is a polymer comprising two or more networks which are at least partially interlaced on a polymer scale but not covalently bonded to each other. The network cannot be separated unless chemical bonds are broken. The two or more networks can be envisioned to be entangled in such a way that they are concatenated and cannot be pulled apart, but not bonded to each other by any chemical bond. In one embodiment, the Zn-MOF has at least 2, preferably at least 3, more preferably at least 4, even more preferably at least 5, or exactly 5 interpenetrating diamondoid frameworks. For better visibility, the Zn-MOF structures of FIGS. 1, 9, and 10 only show a single framework and no interpenetrating frameworks.

As mentioned previously, in one embodiment, each $Zn^{2+}$ ion center is connected to four linkers. In one embodiment, a linker may be a polycarboxylate including, but not limited to, di-, tri-, tetra-, and/or hexacarboxylates. In one embodiment, a linker may be selected from the group consisting of bidentate carboxylates, tridentate carboxylates, tetradentate carboxylates, azoles, and neutral ligands.

In one embodiment, the linker may be considered to be "derived" from a carboxylic acid. Here, the term "derived" means that the bidentate organic compound is present in partly deprotonated or completely deprotonated form.

Exemplary tetradentate carboxylates include, but are not limited to, carboxylates forms of 1,2,4,5-benzenetetracarboxylic acid, biphenyl-3,3',5,5'-tetracarboxylic acid, 1,2,3, 4-cyclobutanetetracarboxylic acid, 1,2,3,4-butanetetracarboxylic acid, and the like. Exemplary azoles include, but are not limited to, 1,2,3-triazole (1H-1,2,3-triazole, $C_2H_3N_3$), pyrrodiazole (1H-1,2,4-triazole, $C_2H_3N_3$), and the like. Exemplary suitable neutral ligands included, but are not limited to, piperazine and 4,4'-bipyridine.

In a preferred embodiment, the Zn-MOF comprises a linker that is a bidentate carboxylate derived from a dicarboxylic acid such as oxalic acid, succinic acid, tartaric acid, 1,4-butanedicarboxylic acid, 1,4-butenedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 1,3-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diamino-phenylmethane-3,3'-dicarboxylic acid, quinoline-3,4-dicarboxylic acid, 7-chloro-4-hydroxyquinoline-2,8-dicarboxylic acid, diimidedicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octadicarboxylic acid, pentane-3,3-carboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,4-bis(phenylamino)benzene-2,5-dicarboxylic acid, 1,1'-binaphthyldicarboxylic acid, 7-chloro-8-methylquinoline-2,3-dicarboxylic acid, 1-anilinoanthraquinone-2,4'-dicarboxylic acid, polytetrahydrofuran 250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, phenylindandicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2,-benzoylbenzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diamino(diphenyl ether)diimidedicarboxylic acid, 4,4'-diaminodiphenylmethanediimidedicarboxylic acid, 4,4'-diamino(diphenyl sulfone)diimidedicarboxylic acid, 1,4-naphthalenedicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenecarboxylic acid, 8-sulfo-2,3-naphthalenedicarboxylic acid, anthracene-2,3-dicarboxylic acid, 2',3'-diphenyl-p-terphenyl-4,4'-dicarboxylic acid, (diphenyl ether)-4,4'-dicarboxylic acid, imidazole-4,5-dicarboxylic acid, 4(1H)-oxothiochromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptadicarboxylic acid, 5-hydroxy-1,3-benzenedicarboxylic acid, 2,5-dihydroxy-1,4-dicarboxylic acid, pyrazine-2,3-dicarboxylic acid, furan-2,5-dicarboxylic acid, 1-nonen-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenon-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrol-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecanedicarboxylic acid, 5,6-dehydronorbornane-2,3-dicarboxylic acid, 5-ethyl-2,3-pyridinedicarboxylic acid, or camphordicarboxylic acid.

In a preferred embodiment, the bidentate carboxylate is derived from aromatic dicarboxylic acids having from 6 to 14 ring atoms which can be carbon or nitrogen. However, the ring preferably does not have any heteroatoms. The aromatic dicarboxylic acids is preferably derived from a benzenedicarboxylic or naphthalenedicarboxylic acid, including 1,2-benzenedicarboxylic acid (phthalic acid), 1,3-benzenedicarboxylic acid (isophthalic acid), 1,4-benzenedicarboxylic acid (terephthalic acid), 2,6-naphthalenedicarboxylic acid, 1,4-naphthalenedicarboxylic acid and 1,5-naphthalenedicarboxylic acid. In a preferred embodiment, at least one of the four linkers, or two of the four linkers in the Zn-MOF is terephthalic acid (benzene-1,4-dicarboxylic acid, which may be abbreviated as "$H_2bdc$," or as the deprotonated form, "bdc").

In one embodiment, the Zn-MOF may comprise a diamine linker. In one embodiment, the diamine linkers each have two aromatic heterocyclic groups, each aromatic heterocyclic group independently comprising 1-5, preferably 1-3 amines, even more preferably 1 amine.

In one embodiment, either or both aromatic heterocyclic groups may comprise or be derived from imidazole, pyrazole, 1,2,3-triazole, 1,2,4-triazole, tetrazole, pentazole, oxazole, isoxazole, 1,2,3-oxadiazole, oxadiazole, furazan, 1,3,4-oxadiazole, thiazole, isothiazole, thiadiazole, 1,2,4-thiadiazole, 1,2,5-thiadiazole, 1,3,4-thiadiazole, indole, indazole, benzamidazole, a diazine, a triazine, a tetrazine, a pentazine, or hexazine. In one embodiment, the two aromatic heterocyclic groups may be identical. In a preferred embodiment, the two aromatic heterocyclic groups are both pyridyl groups. In another embodiment, the diamine linker may further comprise other functional groups, preferably a cyclohexane. In one embodiment, the cyclohexane may be located between the aromatic heterocyclic groups, for instance, the aromatic heterocyclic groups may be bound at the 1,4 positions of the cyclohexane.

In one embodiment, the aromatic heterocyclic groups belonging to one framework define planes that are substantially parallel with each other. As defined here, plane being "substantially parallel" with another plane means that the two planes form a dihedral angle of less than 6°, preferably less than 5°, more preferably less than 3°, where a dihedral angle of exactly 0° denotes planes that are perfectly parallel. For a population of more than two planes to be substantially parallel with each other means that any pair of planes selected from the population is substantially parallel with one another.

In one embodiment, the diamine linker is N,N'-bis(pyridin-3-ylmethylene)cyclohexane-1,4-diamine (bpcda). Preferably the cyclohexane group of the N,N'-bis(pyridin-3-ylmethylene)cyclohexane-1,4-diamine is in chair conformation.

In one embodiment, other molecules may be within the cavities of the Zn-MOF or coordinated to the $Zn^{2+}$ ion centers as monodentate ligands. For instance, water or DMF may be coordinated to the $Zn^{2+}$ ion centers or dispersed in cavities or pores of the Zn-MOF.

In a preferred embodiment, in the Zn-MOF of the present disclosure, each $Zn^{2+}$ ion center is coordinated with four linkers. These four linkers comprise two diamine linkers and two dicarboxylic acid linkers. Each $Zn^{2+}$ ion center is linked to each diamine linker through an N atom and linked to each dicarboxylic acid linker through a carboxylic acid group, or more specifically, an O atom of a carboxylic acid group. In a preferred embodiment, the Zn-MOF is a metal-coordination polymer of $[Zn(bpcda)(bdc)]_n$. In one embodiment, the four linkers consist of two diamine linkers and two dicarboxylic acid linkers.

As used herein, UV-Vis spectroscopy or UV-Vis spectrophotometry refers to absorption spectroscopy or reflectance spectroscopy in the ultraviolet-visible spectral region. In one embodiment, the Zn-MOF has an ultraviolet visible absorption with an absorbance maximum in a range of 280-400 nm, preferably 300-380 nm. In one embodiment, the Zn-MOF may have two adsorption peaks in a range of 280-400 nm, preferably 300-380 nm. One adsorption peak may be centered at 305-350 nm, preferably 308-320 nm. A second adsorption peak may be centered at 350-380 nm, preferably 360-375 nm.

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Surface area is a property of solids which is the total surface area of a material per unit of mass, solid, or bulk volume, or cross sectional area. In most embodiments, BET surface area is measured by gas adsorption analysis, preferably $N_2$ adsorption analysis. In a preferred embodiment, the Zn-MOF has a BET surface area of 50-500 $m^2/g$, preferably 75-400 $m^2/g$, preferably 80-350 $m^2/g$, preferably 100-300 $m^2/g$.

According to a second aspect, the present disclosure relates to a method of making the Zn-MOF of the first aspect of the disclosure. In a preferred embodiment, the Zn-MOF is produced by a solvothermal method. Typically a solvothermal synthesis comprises the reaction of one or more metal salts and one or more linkers in the presence of organic solvents or mixtures, preferably involving formamide, alcohols, or pyrrolidones. Important parameters in the solvothermal synthesis include, but are not limited to, temperature, concentration of reactants (which can be varied over a wide range) and pH of the reaction solution. It is equally envisaged that the present process in any of its embodiments may be adapted to produce the Zn-MOF of the present disclosure in any of its embodiments by other methods of synthesis which may be used to tailor the properties of the metal organic framework. Exemplary suitable methods that may be used in addition to or in lieu of a solvothermal method include, but are not limited to, mechanochemical methods, electrochemistry methods, assisted synthesis methods (i.e. by ultrasound or microwave), and subcritical water methods.

Here, the method comprises the steps of mixing a $Zn^{2+}$ source, the linkers (the diamine linker and the dicarboxylic acid linker), an organic solvent, and water to produce a mixture.

In one embodiment, the $Zn^{2+}$ source may be a zinc salt or zinc hydrated salt. Exemplary zinc salts or hydrates include, but are not limited to, zinc nitrate ($Zn(NO_3)_2$), zinc chlorate $Zn(ClO_3)_2$, zinc sulfate ($ZnSO_4$), zinc phosphate ($Zn_3(PO_4)_2$) zinc molybdate ($ZnMoO_4$), zinc chromate ($ZnCrO_4$), zinc arsenite ($Zn(AsO_2)_2$), zinc arsenate octahydrate ($Zn(AsO_4)_2 \cdot 8H_2O$), zinc acetate ($Zn(O_2CCH_3)_2$), zinc bromide, zinc bromide dehydrate, zinc chloride, zinc citrate dihydrate, zinc cyanide, zinc fluoride, zinc hexafluorosilicate, zinc iodide, zinc methacrylate, zinc nitrate hydrate, zinc oxalate hydrate, zinc perchlorate hexahydrate, zinc selenite, zinc sulfate heptahydrate, zinc tetrafluoroborate hydrate, zinc p-toluenesulfonate hydrate, and the like. In a preferred embodiment, the $Zn^{2+}$ source is $Zn(NO_3)_2$, or $Zn(NO_3)_2 \cdot 6H_2O$.

In one embodiment, a molar ratio of Zn to either linker in the mixture is in a range of 1:1.5-2:1, preferably 1:1.2-1.5:1, or about 1:1. In one embodiment, Zn is present in the mixture at a concentration in a range of 0.05-0.5 M, preferably 0.08-0.3 M, more preferably about 0.1 M.

In one embodiment, the organic solvent may be one or more solvents selected from ethers (e.g. diethyl ether, tetrahydrofuran, 1,4-dioxane, tetrahydropyran, t-butyl methyl ether, cyclopentyl methyl ether, di-iso-propyl ether), glycol ethers (e.g. 1,2-dimethoxyethane, diglyme, triglyme), alcohols (e.g. methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol, 3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, cyclohexanol), aromatic solvents (e.g. benzene, o-xylene, m-xylene, p-xylene, mixtures of xylenes, toluene, mesitylene, anisole, 1,2-dimethoxybenzene, α,α,α-trifluoromethylbenzene, fluorobenzene), chlorinated solvents (e.g. chlorobenzene, dichloromethane, 1,2-dichloroethane, 1,1-dichloroethane, chloroform), ester solvents (e.g. ethyl acetate, propyl acetate), amide solvents (e.g. dimethylformamide, dimethylacetamide, N-methyl-2-pyrrolidone), urea solvents, ketones (e.g. acetone, butanone), acetonitrile, propionitrile, butyronitrile, benzonitrile, dimethyl sulfoxide, ethylene carbonate, propylene carbonate, 1,3-dimethyl-3,4,5,6-tetrahydro-2(1H)-pyrimidinone, and mixtures thereof. The solvent may be selected from non-polar solvents (e.g. hexane, benzene, toluene, diethyl ether, chloroform, 1,4-dioxane), polar aprotic solvents (e.g. ethyl acetate, tetrahydrofuran, dichloromethane, acetone, acetonitrile, dimethylformamide, dimethyl sulfoxide) and polar protic solvents (e.g. acetic acid, n-butanol, isopropanol, n-propanol, ethanol, methanol, formic acid, water) and mixtures thereof. Preferably the organic solvent is dimethylformamide (DMF).

After the mixing, the mixture is heated to produce a precipitate. The mixture is heated at a temperature in a range of 90-150° C., preferably 95-140° C., more preferably 100-130° C., or about 105° C. for a time period in a range of 12 h-5 days, preferably 24-96 h, more preferably about 72 h. In one embodiment, the mixture may be heated in an autoclave (or other enclosed vessel) and at an elevated pressure. In one embodiment, the mixture may be continually mixed or agitated during the heating. Alternatively, the mixture may not be disturbed during the heating.

The heating produces a precipitate comprising crystals of the Zn-MOF. Preferably, immediately after the step of heating the mixture, the mixture is allowed to cool to room temperature. The precipitate may be isolated and purified by methods known to those of ordinary skill in the art, such as filtration, decantation, aqueous work-up, extraction with organic solvents, distillation, crystallization, column chromatography, and high pressure liquid chromatography (HPLC) on normal phase or reversed phase. The precipitate may be rinsed with an organic solvent such as those previously mentioned, and then dried. In one embodiment, the precipitate is dried at room temperature in air for 1-24 h, preferably 2-18 h, though in other embodiments, the precipitate may be dried in an oven at 80–100° C., in an atmosphere of an inert gas, or may be dried under a reduced pressure such as in a vacuum desiccator.

The Zn-MOF may be in the form of polyhedral crystals, preferably octahedral or cubic in shape, with an average diameter or longest linear dimension of 10-200 µm, preferably 20-150 µm, more preferably 40-100 µm. In one embodiment, block-like crystals may be obtained with lengths in a range of 50-150 µm, or about 100 µm; widths in a range of 20-60 µm, or about 40 µm; and heights in a range of 20-60 µm, or about 40 µm.

Figure 6:
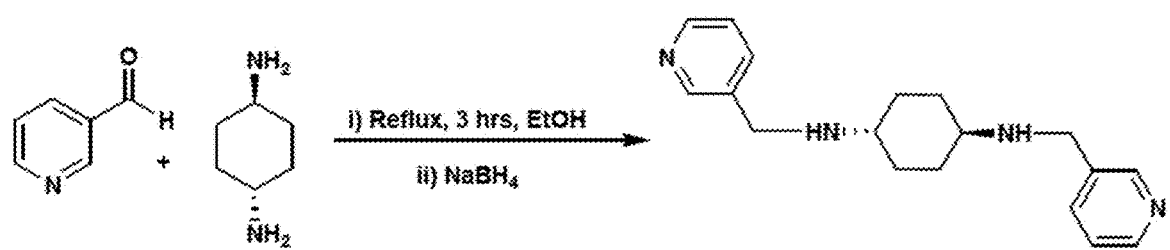
FIG. 6 shows the synthesis route for producing N,N'-bis(pyridine-3-ylmethylene)cyclohexane-1,4-diamine.

In one embodiment, the method of making the Zn-MOF involves synthesizing the diamine linker before mixing the $Zn^{2+}$ source with the linkers. An example synthesis procedure for a diamine linker is shown in FIG. 6. Here, N,N'-bis(pyridine-3-ylmethylene)cyclohexane-1,4-diamine ("bpcda") is synthesized by mixing 3-pyridylcarboxyldehyde with (1R, 4R)-cyclohexane-1,4-diamine at a molar ratio in a range of 1.0:1.1-1.1:1.0 or about 1:1, in an organic solvent. The organic solvent may be any of those previously mentioned; preferably the organic solvent is ethanol. The 3-pyridylcarboxyldehyde and (1R, 4R)-cyclohexane-1,4-diamine may each be present in the organic solvent at a concentration in a range of 1.2-1.8 M, or about 1.5 M. Triethylamine may then be added, having a molar ratio with the 3-pyridylcarboxyldehyde in a range of 1.2:1-1.8:1. The reaction mixture may be refluxed for 2-8 h, preferably about 4 h, and then cooled. $NaBH_4$ or some other reducing agent may be added, and the reaction mixture stirred for 12-20 h at room temperature. The organic layers of the mixture may be extracted and dried to produce the diamine linker N,N'-bis(pyridine-3-ylmethylene)cyclohexane-1,4-diamine ("bpcda").

According to a third aspect, the present disclosure relates to a photoelectrochemical cell. The photoelectrochemical cell has a photoelectrode comprising the Zn-MOF of the first aspect of the disclosure deposited on a metal oxide conducting substrate, a counter electrode, and an aqueous electrolyte solution in contact with both electrodes. As used herein, the term "electrodes," refers to both the photoelectrode and the counter electrode, unless otherwise noted.

In one embodiment, the metal oxide conducting substrate is a transparent conducting film selected from the group consisting of ITO (indium tin oxide), FTO (fluorine-doped tin oxide), AZO (aluminum-doped zinc oxide), GZO (gallium-doped zinc oxide), IZO (indium zinc oxide), IZTO (indium zinc tin oxide), IAZO (indium aluminum zinc oxide), IGZO (indium gallium zinc oxide), IGTO (indium gallium tin oxide), and ATO (antimony tin oxide). In other embodiments, transparent conducting polymers (such as PEDOT) or carbon nanotubes may be used with or in place of the compounds previously mentioned. In a preferred embodiment, the substrate is FTO. The transparent conducting film may have an average thickness of 1-1 mm, preferably 10 µm-900 µm, more preferably 200 µm-800 µm, or about 600 µm. Alternatively, the transparent conducting film may have an average thickness of 500 nm-200 µm, preferably 1-100 µm, more preferably 10 µm-50 µm. Preferably the transparent conducting film is attached to an additional support, such as a glass slide. However, in other embodiments, the substrate may be glass, quartz, ceramic, a metal, a composite material, or a polymeric material having temperature resistance at least up to the temperature of the substrate heating. Where the substrate comprises glass, the glass may be boro-aluminosilicate glass, sodium borosilicate glass, fused-silica glass, soda lime glass, or some other type of glass.

In one embodiment, the metal oxide conducting substrate has a sheet resistance in a range of 1-40Ω $sq^{-1}$, preferably 2-20Ω $sq^{-1}$, more preferably 4-12Ω $sq^{-1}$, or about 8Ω $sq^{-1}$. Preferably, the Zn-MOF in contact with the substrate forms an electrically-conductive material with the conductive layer. An "electrically-conductive material" as defined here is a substance with an electrical resistivity of at most $10^{-6}$ Ω·m, preferably at most $10^{-7}$ Ω·m, more preferably at most $10^{-8}$ Ω·m at a temperature of 20-25° C.

In one embodiment, the Zn-MOF may be mixed with an organic solvent to form a slurry, and then contacted with the metal oxide conducting substrate, or otherwise drop-coated. After the contacting, the Zn-MOF photoelectrode may be formed by heating at 70-120° C., preferably 75-100° C., or about 80° C. for a time period in a range of 1-6 h, preferably about 2 h. The Zn-MOF of the Zn-MOF photoelectrode may be in the form of particles having an average diameter in a range of 500 nm-500 µm, preferably 700 nm-400 µm, more preferably 900 nm-300 µm, more preferably 5-100 µm.

In one embodiment, the Zn-MOF may be deposited to form a Zn-MOF layer on the metal oxide conducting substrate, the Zn-MOF layer having an average thickness in a range of 500 nm-200 µm, preferably 700 nm-100 µm. In one embodiment, the Zn-MOF layer may completely cover the metal oxide conducting substrate.

In one embodiment, the photoelectrochemical cell comprises a vessel having an internal cavity for holding the electrolyte solution. The photoelectrochemical cell may be similar to an electrochemical cell with a transparent window or enclosure to allow electromagnetic radiation to reach the photoelectrode of interest. Alternatively, a photoelectrochemical cell may be enclosed in a flat, transparent housing so that the photo electrode has a greater surface area facing an irradiation source. A photoelectrochemical cell may be used with mirrors, lenses, shutters, optical filters, optical fibers, or other optical devices in order to modulate or direct an incoming irradiation. The vessel of the cell may be cylindrical, cuboid, frustoconical, spherical, or some other shape. The vessel walls may comprise a material including, but not limited to, glass, polypropylene, polyvinyl chloride, polyethylene, and/or polytetrafluoroethylene, and the vessel walls may have a thickness of 0.1-3 cm, preferably 0.1-2 cm, more preferably 0.2-1.5 cm. The internal cavity may have a volume of 2 mL-100 mL, preferably 2.5 mL-50 mL, more preferably 3 mL-20 mL. In another embodiment, for instance, for small scale or larger benchtop studies, the internal cavity may have a volume of 100 mL-10 L, preferably 1 L-5 L, more preferably 2 L-4 L. In one embodiment, one or more photoelectrochemical cells may be connected to each other in parallel and/or in series. In another embodiment, the electrolyte solution may be in contact with more than one photoelectrode and/or more than one counter electrode.

In one embodiment, the counter electrode comprises gold, platinum, or carbon. In a further embodiment, the counter electrode comprises platinum. In one embodiment, the counter electrode may be in the form of a wire, a rod, a cylinder, a tube, a scroll, a sheet, a piece of foil, a woven mesh, a perforated sheet, or a brush. The counter electrode may be polished in order to reduce surface roughness or may be texturized with grooves, channels, divots, microstructures, or nanostructures.

Preferably the photoelectrochemical cell also includes a reference electrode in contact with the electrolyte solution. A reference electrode is an electrode which has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is a silver chloride electrode (Ag/AgCl) using saturated KCl.

In one embodiment, the aqueous electrolyte solution comprises water and an electrolyte. The electrolyte may have a concentration of 0.1-1.0 M, preferably 0.2-0.8 M, more preferably 0.3-0.7 M, or about 0.5 M. The electrolyte may comprise at least one cation selected from the group consisting of $K^+$, $Na^+$, $Li^+$, $Cu^{2+}$, $Ag^+$, $Ni^{2+}$, $Co^{2+}$, $Co^{3+}$, $Zn^{2+}$, $Sn^{2+}$, $Pb^{2+}$, $Fe^{2+}$, $Fe^{3+}$, $Cr^{2+}$, and $Cr^{3+}$. The counter ion of the salt may be $SO_4^{2-}$, $Br^-$, $NO_3^-$, $OH^-$, $Cl^-$, acetate, or some other anion. In a preferred embodiment, the electrolyte is $Na_2SO_4$. Preferably the aqueous electrolyte solution has a pH in a range of 6.5-7.5, preferably 6.7-7.3, or about 7.0. In one embodiment, the aqueous electrolyte solution does not comprise a sacrificial oxidant. In a preferred embodiment, the electrolyte solution may have a total volume of 1 mL-10 L, preferably 5 mL-1 L, more preferably 10 mL-500 mL, even more preferably 15 mL-300 mL.

In one embodiment, the photoelectrode has a width and/or length in contact with the aqueous electrolyte solution of 0.1-5.0 cm, preferably 0.3-4.0 cm, more preferably 0.5-3.0. The photoelectrode may have a surface area of 0.5-10 $cm^2$, preferably 0.7-5 $cm^2$, more preferably 1-3 $cm^2$ in contact with the aqueous electrolyte solution.

In one embodiment, the photoelectrode has a current density in a range of 15-40 μA/$cm^2$, preferably 20-35 μA/$cm^2$, more preferably 22-32 μA/$cm^2$, when the electrodes are subjected to a bias potential of 0.05-1.0 V, preferably 0.1-0.9 V, more preferably 0.2-0.8 V and an illumination of 80-150 mW/$cm^2$, preferably 90-120 mW/$cm^2$, more preferably 95-110 mW/$cm^2$.

The source of the illumination may be a solar simulator that may use a xenon arc lamp or a halogen lamp. In one embodiment, the radiation source may be fitted with a dichroic reflector and/or an optical filter in order to better reproduce solar light illumination, such as illumination having an AM1.5G spectrum, which may be known as the "global standard" spectrum.

As described here, the air mass coefficient (AM) defines the direct optical path length through the Earth's atmosphere, expressed as a ratio relative to the path length vertically upwards, i.e. at the zenith. The air mass coefficient can be used to help characterize the solar spectrum after solar radiation has traveled through the atmosphere. The air mass coefficient is commonly used to characterize the performance of solar cells under standardized conditions, and is often referred to using the syntax "AM" followed by a number. The air mass number is dependent on the Sun's elevation path through the sky and therefore varies with time of day and with the passing seasons of the year, and with the latitude of the observer. For characterizing terrestrial power-generating panels, the "AM1.5" standard is commonly used for illumination. "AM1.5" represents sunlight through a 1.5 atmosphere thickness, which corresponds to a solar zenith angle of 48.2°. The spectrum may be similar to those defined by ASTM G-173 and IEC 60904 standards. In other embodiments, the illumination may have an AM1.5D spectrum, which is known as the "direct standard" spectrum. In alternative embodiments, a different illumination standard may be used, such as AM0, AM1, AM2, AM3, or AM38.

According to a fourth aspect, the present disclosure relates to a method of photoelectrochemical water splitting. In general, photoelectrochemical water splitting is an artificial photosynthesis process with photocatalysis in a photoelectrochemical cell used for the dissociation of water into its constituent parts, $H_2$ and $O_2$, using either artificial or natural light. Here, this method involves irradiating the photoelectrochemical cell of the third aspect with sunlight. Alternatively, the photoelectrochemical cell may be irradiated with light from a gas discharge lamp (such as a mercury vapor lamp, a xenon lamp, an argon lamp, or a metal halide lamp), a laser, an LED, and/or an incandescent bulb. In one embodiment, a lamp as a solar simulator may be used.

In one embodiment, the solar simulator output to the photoelectrode may be 40-160 mW/$cm^2$, preferably 50-150 mW/$cm^2$, more preferably 90-110 mW/$cm^2$, or about 100 mW/$cm^2$.

During the irradiating, a bias voltage of 0.05-1.5 V, preferably 0.1-1.0 V, or 0.5-0.9 V may be applied to the photoelectrode and the counter electrode. Preferably the photoelectrode functions as the cathode, receiving a negative potential to reduce water into $H_2$ gas and $OH^-$, while the counter electrode functions as the anode, receiving a positive potential to oxidize $OH^-$ into $O_2$ gas and $H_2O$. This is summarized by the following reactions:

| | |
|---|---|
| $2H_2O_{(l)} + 2e^- \rightarrow H_{2(g)} + 2OH^-_{(aq)}$ | Cathode (reduction): |
| $4OH^-_{(aq)} \rightarrow O_{2(g)} + 2H_2O_{(l)} + 4e^-$ | Anode (oxidation): |
| $2H_2O_{(l)} \rightarrow 2H_{2(g)} + O_{2(g)}$ | Overall reaction: |

In another embodiment, the potentials may be switched, wherein the photoelectrode functions as the anode and receives a positive potential, and the counter electrode functions as the cathode and receives a negative potential. In an alternative embodiment, the electrodes may be subjected to an alternating current (AC) in which the anode and cathode roles are continually switched between the two electrodes.

In one embodiment, the potential may be applied to the electrodes by a battery, such as a battery comprising one or more electrochemical cells of alkaline, lithium, lithium-ion, nickel-cadmium, nickel metal hydride, zinc-air, silver oxide, and/or carbon-zinc. In another embodiment, the potential may be applied through a potentiostat or some other source of direct current, such as a photovoltaic cell. In one embodiment, a potentiostat may be powered by an AC adaptor, which is plugged into a standard building or home electric utility line. In one embodiment, the potentiostat may connect with a reference electrode in the electrolyte solution. Preferably the potentiostat is able to supply a relatively stable voltage or potential. For example, in one embodiment, the electrochemical cell is subjected to a voltage that does not vary by more than 5%, preferably by no more than 3%, preferably by no more than 1.5% of an average value throughout the subjecting. In another embodiment, the voltage may be modulated, such as being increased or decreased linearly, being applied as pulses, or being applied with an alternating current. Preferably, the photoelectrode may be considered the working electrode with the counter electrode being considered the auxiliary electrode. However, in some embodiments, the photoelectrode may be considered the auxiliary electrode with the counter electrode being considered the working electrode.

In one embodiment, the method further comprises the step of separately collecting $H_2$-enriched gas and $O_2$-enriched gas. In one embodiment, the space above each electrode may be confined to a vessel in order to receive or store the evolved gases from one or both electrodes. The collected gas may be further processed, filtered, or compressed. Preferably the $H_2$-enriched gas is collected above the cathode, and the $O_2$-enriched gas is collected above the anode. The electrolytic cell, or an attachment, may be shaped so that the headspace above the photoelectrode is kept separate from the headspace above the reference electrode. In one embodiment, the $H_2$-enriched gas and the $O_2$-enriched gas are not 100 vol % $H_2$ and 100 vol % $O_2$, respectively. For example, the enriched gases may also comprise $N_2$ from air, and water vapor and other dissolved gases from the electrolyte solution. The $H_2$-enriched gas may also comprise $O_2$ from air. The $H_2$-enriched gas may comprise greater than 20 vol % $H_2$, preferably greater than 40 vol % $H_2$, more preferably greater than 60 vol % $H_2$, even more preferably greater than 80 vol % $H_2$, relative to a total volume of the receptacle collecting the evolved $H_2$ gas. The $O_2$-enriched gas may comprise greater than 20 vol % $O_2$, preferably greater than 40 vol % $O_2$, more preferably greater than 60 vol % $O_2$, even more preferably greater than 80 vol % $O_2$, relative to a total volume of the receptacle collecting the evolved $O_2$ gas. In some embodiments, the evolved gases may be bubbled into a vessel comprising water or some other liquid, and higher concentrations of $O_2$ or $H_2$ may be collected. In one embodiment, evolved $O_2$ and $H_2$, or $H_2$-enriched gas and $O_2$-enriched gas, may be collected in the same vessel.

Several parameters for the method for decomposing water may be modified to lead to different reaction rates, yields, and other outcomes. These parameters include, but are not limited to, electrolyte type and concentration, pH, pressure, solution temperature, current, voltage, stirring rate, electrode surface area, size of Zn-MOF particles, thickness of the deposited Zn-MOF layer, and exposure time. A variable DC current may be applied at a fixed voltage, or a fixed DC current may be applied at a variable voltage. In some instances, AC current or pulsed current may be used. A person having ordinary skill in the art may be able to adjust these and other parameters, to achieve different results. In other embodiments, the photoelectrochemical cell may be used for other electrochemical reactions or analyses.

In an alternative embodiment, the photoelectrode may be used in the field of batteries, fuel cells, photochemical cells, water splitting cells, electronics, water purification, hydrogen sensors, semiconductors (such as field effect transistors), magnetic semiconductors, capacitors, data storage devices, biosensors (such as redox protein sensors), photovoltaics, liquid crystal screens, plasma screens, touch screens, OLEDs, antistatic deposits, optical coatings, reflective coverings, anti-reflection coatings, and/or reaction catalysis. Similarly, in one embodiment, the photoelectrode may be coated with another material. For example, the photoelectrode may be coated with a layer of gold. A gold-coated photoelectrode may then be used for analyte detection using surface enhanced Raman scattering (SERS).

The examples below are intended to further illustrate protocols for preparing, characterizing the water stable zinc-based metal organic framework, and uses thereof, and are not intended to limit the scope of the claims.

Example 1

Figure 7:
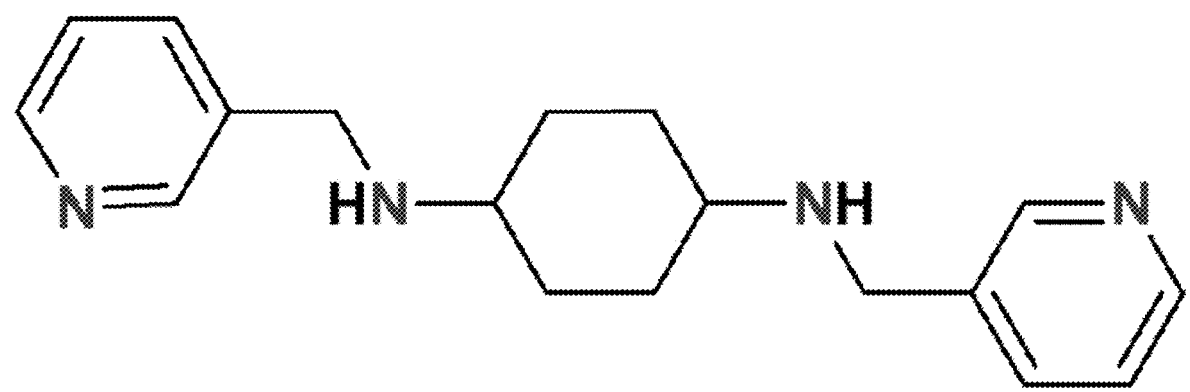
FIG. 7 is the structure of the compound N,N'-bis(pyridine-3-ylmethylene)cyclohexane-1,4-diamine ("3-bpcda" or "bpcda").

The preparation of $[Zn(bpcda)(bdc)]_n$ MOF, or "Zn-MOF," uses a solvothermal synthesis method. This new MOF was characterized by elemental analysis, NMR, FT-IR spectroscopy, and single crystal X-ray crystallography. The crystal structure of Zn-MOF is shown in FIG. 1, with hydrogen atoms omitted for clarity. This MOF crystallizes in a monoclinic crystal system with space group C2/c. The X-ray structure analysis reveals that asymmetric unit of the MOF consists of Zn(II) cation and one unit of each bpcda (FIG. 7) and bdc (FIG. 8) linkers. Single crystal X-ray diffraction results shows that the Zn(II) compound is in a three-dimensional interpenetrating diamondoid framework. The Zn(II) center displays a distorted tetrahedral geometry and is coordinated with two N atoms of two independent bpcda linkers and two O atoms of two independent bdc linkers (FIG. 9). The Zn—N and Zn—O bond distances are 1.959 (1) and 2.048 (1) Å, respectively. The minimum and maximum bond angles involving the Zn(II) ion are 100.77 (8), and 125.37 (5°) respectively. The average bond angle value is 107.67°, which shows deviation from the ideal angle of 109.47° for a perfect tetrahedron. Houser and co-workers has given a simple geometric index for four-coordinate metal system ($\tau 4=360°-(\alpha+\beta)/141°$, where $\alpha$ and $\beta$ are largest angles in the four coordinate metal system). See L. Yang, D. R. Powell, R. P. Houser, *Dalton Trans.* 2007, 955-964, incorporated herein by reference in its entirety. The distortion from an ideal tetrahedron for Zn atom is 0.93, as indicated by the $\tau 4$ value.

Figure 10:
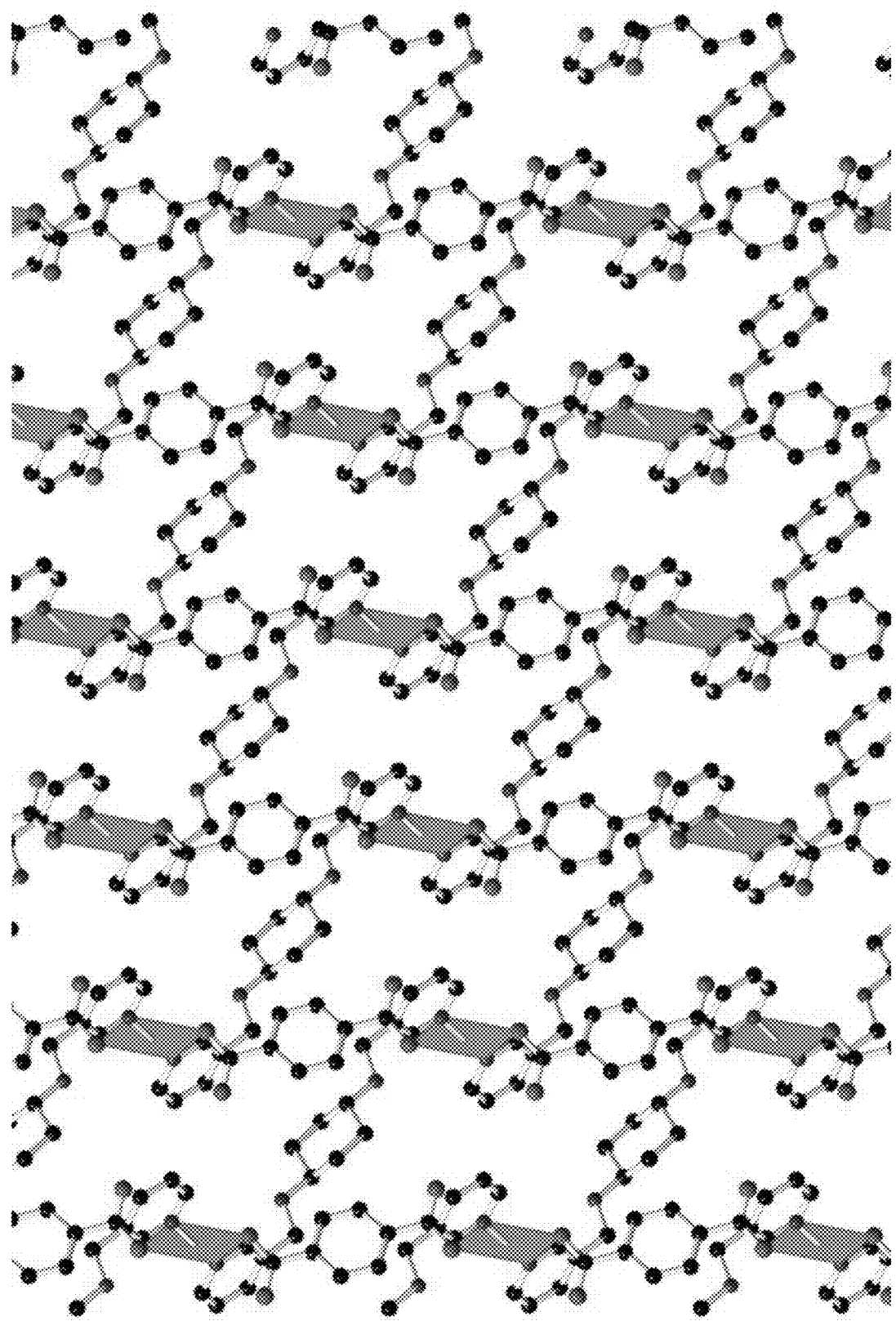
FIG. 10 shows a view of the two-dimensional framework of Zn-MOF extending along the b-axis.

The X-ray structure shows each bdc dianion connecting to adjacent Zn(II) centers in a bridging trans-monodentate mode resulting in zigzag chains. These chains are further extended by the bpcda linkers to form a three-dimensional diamondoid framework (FIG. 10). The Zn(II) compound has a dia-like topology when considering the Zn(II) center as 4-connected nodes and bpcda, bdc as linkers. See aA. C. Wibowo, M. D. Smith, H.-C. zur Loye, *CrystEngComm* 2011, 13, 426-429; bZ. Xu, L. L. Han, G. L. Zhuang, J. Bai, D. Sun, *Inorg. Chem.* 2015, 54, 4737-4743; cZ. Wang, X.-Y. Li, L.-W. Liu, S.-Q. Yu, Z.-Y. Feng, C.-H. Tung, D. Sun, *Chem. Eur. J.* 2016, 22, 6830-6836, incorporated herein by reference in its entirety. Here, each Zn(II) center node is connected to four neighbors, forming an adamantine-like cage, which is a characteristic building block for a diamondoid framework. The Zn . . . Zn separation along with Zn . . . bdc . . . Zn and Zn . . . bpcda . . . Zn is 11.034 and 16.989 Å, respectively. Due to high Zn . . . Zn separation, large cavities are formed within each network. In order to minimize the big voids in the framework, five independent equivalent networks interpenetrate each other for effective filling of voids. The interpenetration of equivalent frameworks results in a three-dimensional architecture. See M. Altaf, M. Mansha, M. Sohail, A. A. Isab, N. Ullah, S. A.

Khan, M. Sher, H. Stoeckli-Evans, *New J. Chem.* 2017, 41, 2980-2986, incorporated herein by reference in its entirety.

Figure 2:
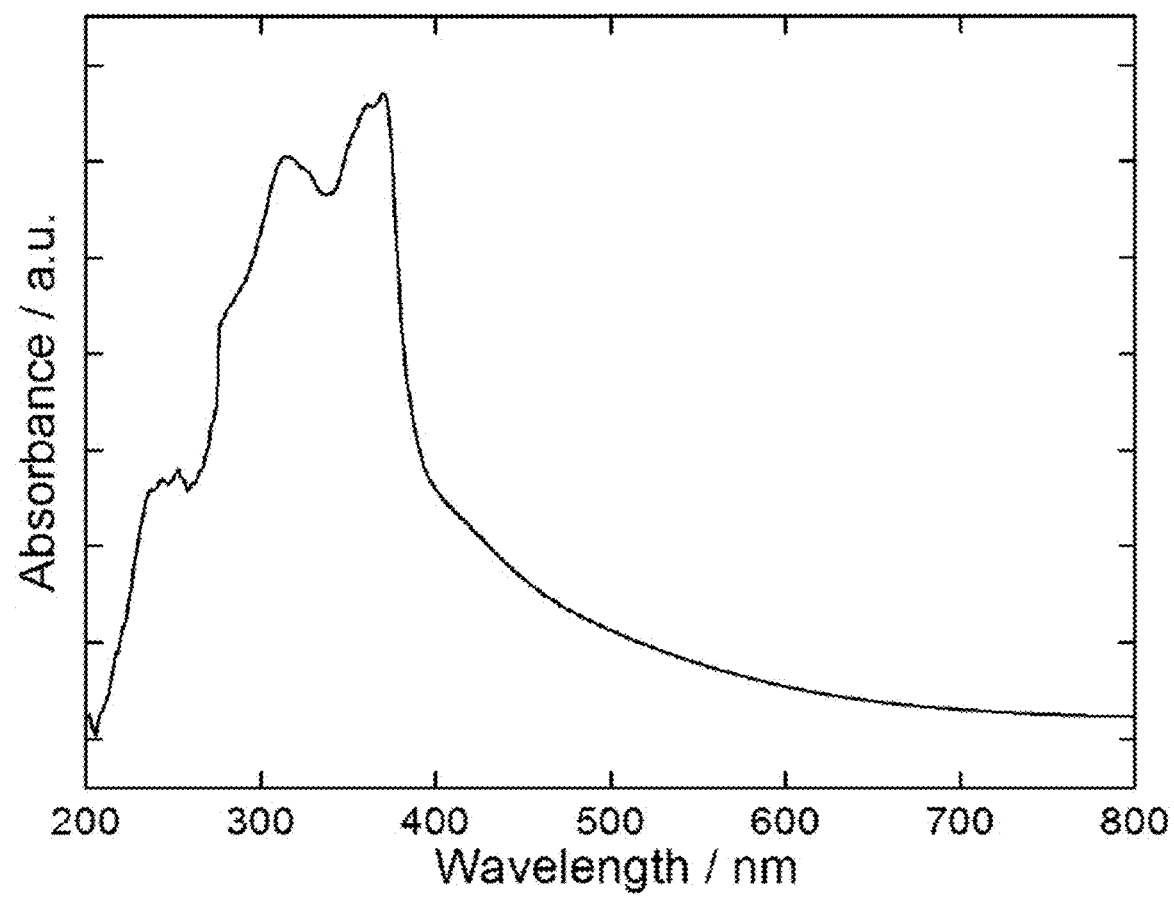
FIG. 2 is a UV-Vis diffuse reflectance spectrum of [Zn(bpcda)(bdc)]$_n$ ("Zn-MOF").

The optical absorption of [Zn(bpcda)(bdc)]$_n$ was investigated using UV-Vis diffuse reflectance (DRS) spectroscopy (FIG. 2). Although a maximum absorption was observed at 370 nm (3.3 eV), a long absorption tail was extended up to 600 nm. In addition, another absorption peak was observed at 313 nm (3.9 eV). Therefore, Zn-MOF was not only capable of absorbing a long range of sunlight radiation but showed multiple HOMO/LUMO levels present in the same compound. These multiple absorption bands can be attributed to the presence of two different ligands and metal centers. The presence of multiple band gaps in the same structure provides efficient separation between electron and hole pairs without addition of any dopant and is responsible for enhanced PEC activity of the Zn-MOF.

Figure 13:
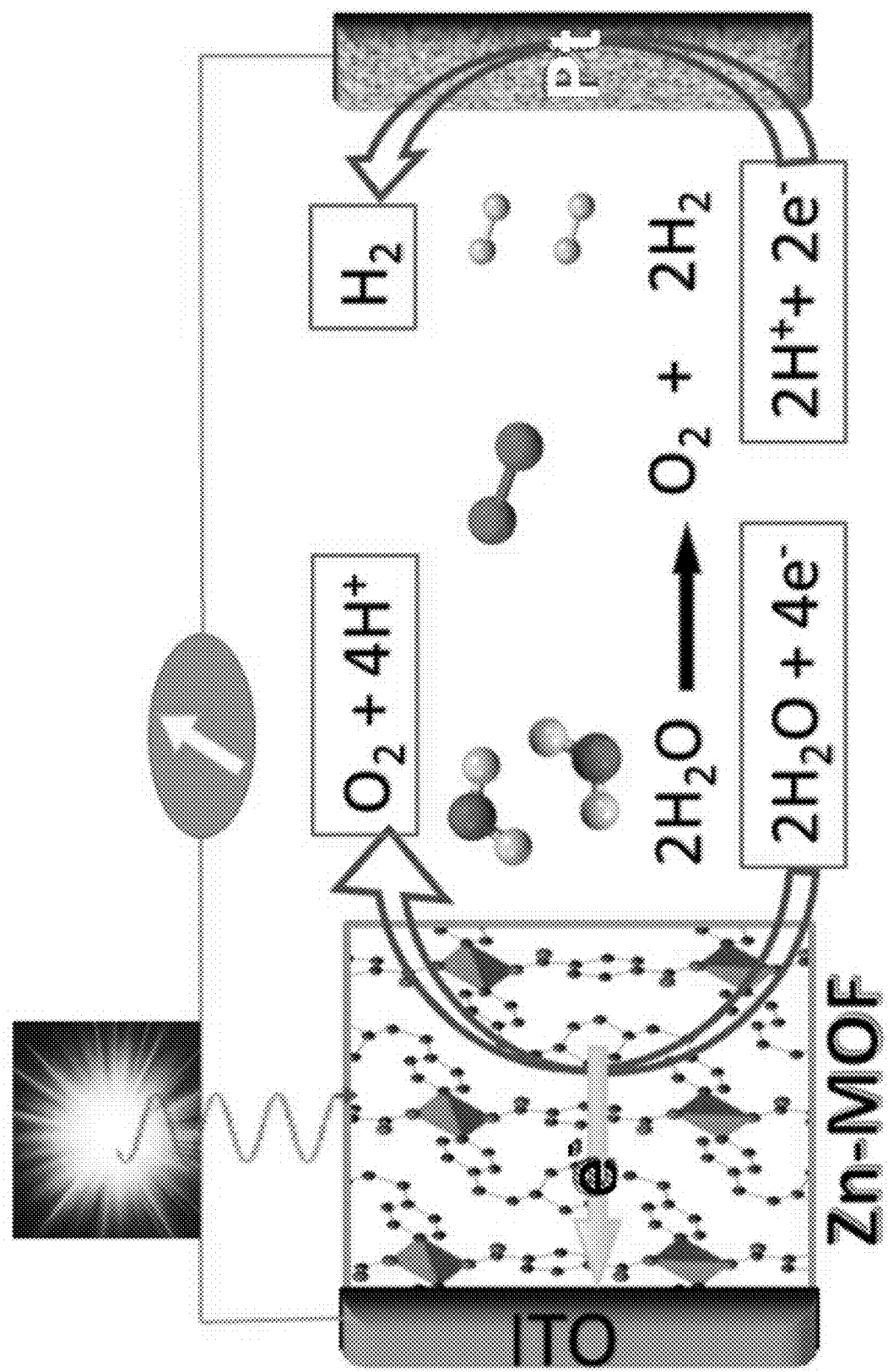
FIG. 13 is a scheme of the Zn-MOF being used for PEC.

After detailed characterization of the material, its activity for photoelectrochemical water splitting was tested, as shown by the scheme in FIG. 13. Photoelectrochemical studies of Zn-MOF were carried out using FTO conducting glass substrates. Initially, FTO substrates were washed with acetone (10 min) and deionized water (10 min) with continuous ultrasonification. The next step involved slurry formation of Zn-MOF samples with ethanol; once a reasonably thick slurry was prepared the Zn-MOF sample was drop-coated over the pre-treated FTO glass substrates. In order to generate a smooth film, the drop-coated Zn-MOF-FTOs were annealed at 80° C. for 2 hours to evaporate solvent and harden the layers over the FTO substrate so that it could withstand the PEC measurements.

The PEC measurements were carried out by a standard three electrode system in 0.5 M Na$_2$SO$_4$ (pH=7.0) solution, where a Pt wire served as auxiliary electrode, Zn-MOF-FTO coated substrate served as photoanode, and the Ag/AgCl/Sat.KCl electrode served as the reference electrode. All PEC experiments were executed through a Metrohm Autolab Potentiostat (PGSTAT302N) instrument. An ORIEL SOL 3A class AAA Solar Simulator (Newport Instrument) was used as an irradiation source with a power density of 100 mW/cm$^2$ (1Sun), IEC/JIS/ASTM certified containing 450 Watt Xenon lamp, an Air Mass 1.5 G Filter, a UV cut-off filter, and a 2×2 inch aperture for beam output. All PEC experimental data obtained was discussed according to the standard Ag/AgCl/Sat.KCl electrode. In chronoamperometric measurements, the PEC cell was exposed to illumination source (1 Sun) in an on/off fashion with regular intervals of time so as to investigate the photoresponse generated by [Zn(bpcda)(bdc)]$_n$ MOF material. Blank FTO showed an almost negligible photo-response at the same applied range of potentials.

Figure 3:
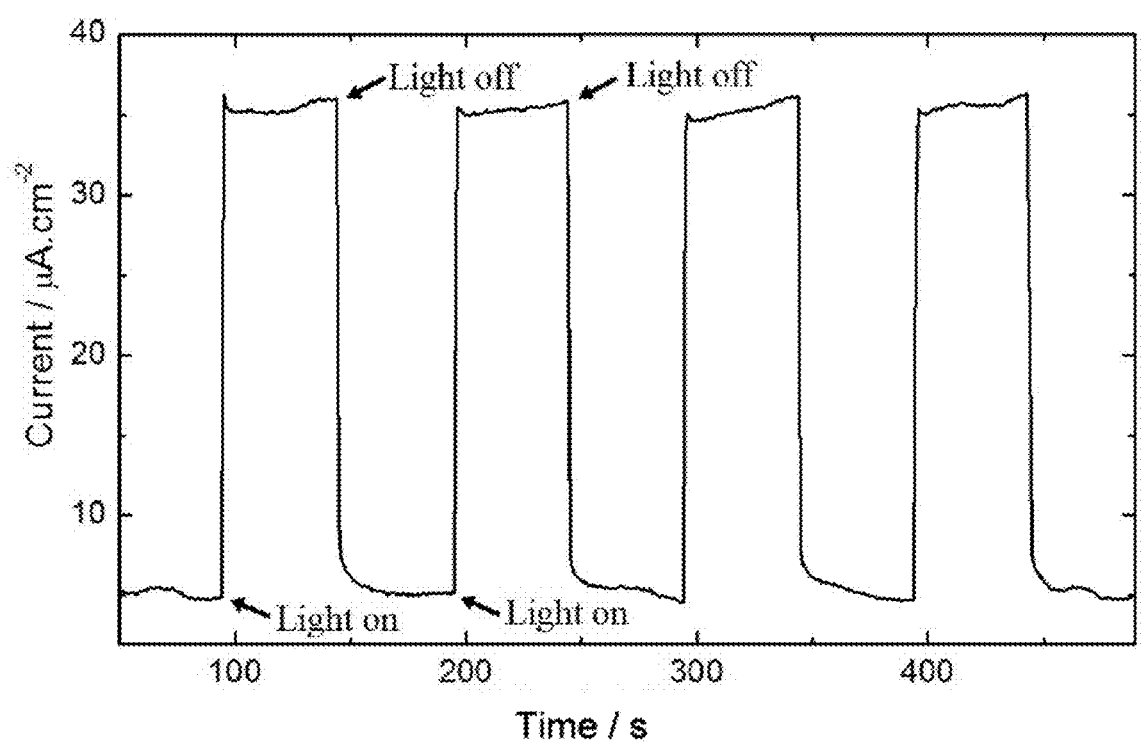
FIG. 3 shows a chronoamperometry curve with 50 s on/off solar light for a [Zn(bpcda)(bdc)]$_n$/FTO photoanode at 0.9 V applied potential.

These characteristics elucidate solar water splitting and O$_2$ evolution reaction of [Zn(bpcda)(bdc)]$_n$ material and its potential applications in PEC processes. The generated photocurrent in PEC studies is attributed to the better electron mobility and minimal electron hole recombination offered by [Zn(bpcda)(bdc)]$_n$. A photocurrent response for oxygen evolution reaction in water splitting has never been reported so far with MOF as sole material without being supported on other heterogeneous material or containing metal particles. Furthermore, no need of an additional oxidant, a sacrificial agent, or pH control was required, thus providing a favorable environment for enhanced stability of the Zn-MOF. FIG. 3, shows the chronoamperometric performance of the [Zn(bpcda)(bdc)]$_n$/FTO photoanode, obtained at 0.9 V (Ag/AgCl/Sat. KCl) as a function of time, under simulated sunlight illumination. Once the current response was stable, the light was chopped off at regular intervals. It is obvious that when light was illuminated at the surfaces of [Zn(bpcda)(bdc)]$_n$/FTO electrode, significant anodic current was produced for O$_2$ generation. When light was chopped off, the photocurrent density instantaneously became negligible. The amounts of generated current were approximately 16 μA·cm$^{-2}$. The photocurrent density spikes (J$_p$ Peaks) explicated significant stability of the [Zn(bpcda)(bdc)]$_n$ material coated over FTOs upon exposure to 1 Sun irradiation for several hours. Furthermore, in a succession of PEC measurements, the J$_p$–t photocurrents were observed to shift to their normal baselines under the dark (no illumination), which exhibited reversible responses. These observations also commended that photocurrent generation from Zn-MOF was exclusively due to solar driven water splitting reaction.

Figure 4:
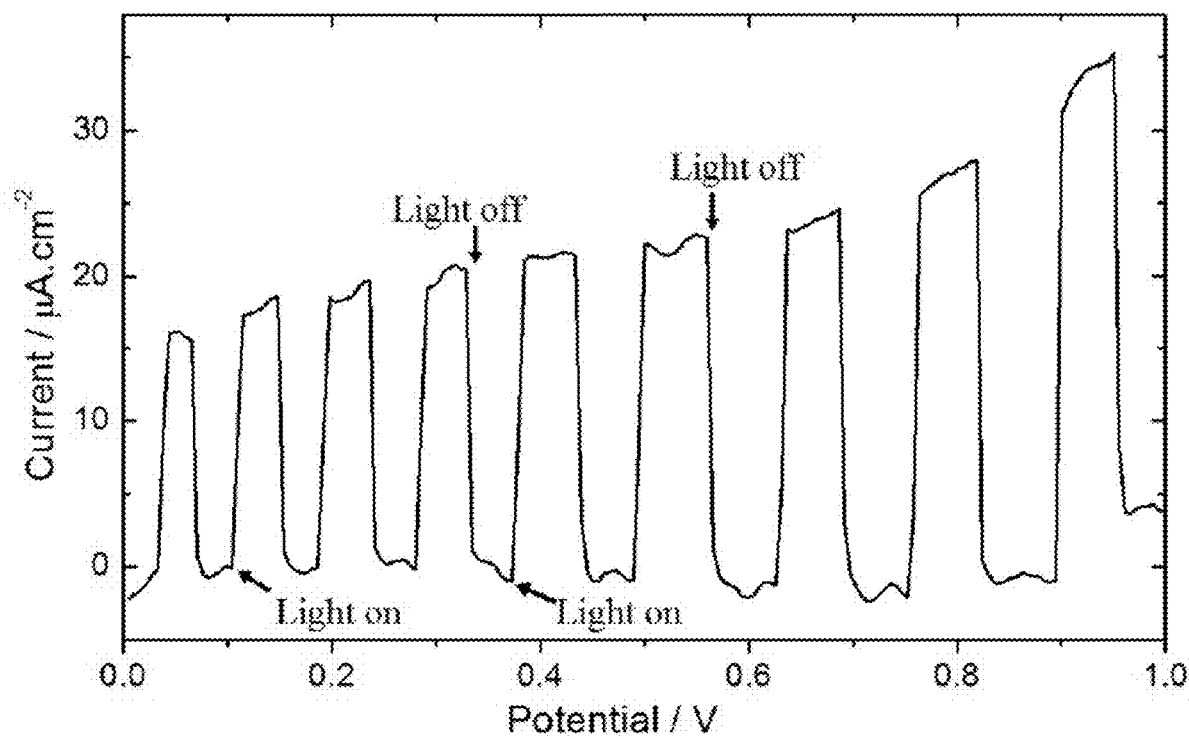
FIG. 4 shows linear sweep voltammetry of [Zn(bpcda)(bdc)]$_n$ coated on FTO glass under simulated solar light chopped at regular intervals (scan rate 10 mVs$^{-1}$).

FIG. 4 shows linear sweep voltammetry (LSV) curves of [Zn(bpcda)(bdc)]$_n$/FTO photoanode (Ag/AgCl/Sat. KCl) under 1 Sun simulated solar light. LSV was carried out with solar light chopped at regular intervals and applied potential scanned from 0.0 to 1.0 V at 10 mVs$^{-1}$ scan rate. FIG. 4 represents LSV curve of [Zn(bpcda)(bdc)]$_n$/FTO electrode under chopped sunlight illumination after subtracting the dark current. Overall current density, at 1.0 V, exceeds 80 μA·cm$^{-2}$. After subtracting the dark current density, at 0 V (Ag/AgCl/Sat. KCl), a pure photo current density of approximately 15 μA·cm$^{-2}$ was observed at 0 V, which increased linearly with increase in the bias voltage. A maximum photo current density exceeding 31 μA·cm$^{-2}$ was observed at 0.9 V. This current response is comparable or better than many metal nanocomposite based semiconductors reported recently as represented in Table 1.

TABLE 1

Comparison of [Zn(bpcda)(bdc)]$_n$ MOF photo-response for water splitting with some recently reported semiconducting nanocomposite materials.

| Nanocomposite Photoanode | Measurement voltage (V)* | Photocurrent (μA · cm$^{-2}$) | Reference |
|---|---|---|---|
| WO$_3$•BiO$_4$ | 0 | 2 | a |
| CuS QDs•TiO2 | 1 | 15 | b |
| ZnO:Cl/Zn$_x$TiO$y$/TiO$_2$ | 1 | 0.4 | c |
| PbTiO$_3$ | 1.02 | 15 | d |
| PbTiO$_3$•PtO nanodots | 1.02 | 60 | d |
| TiO$_2$•gC$_3$N$_4$ (2 h prep. time) | 0.6 | 20 | e |
| TiO$_2$•gC$_3$N$_4$ (4 h prep. time) | 0.6 | 30 | e |
| TiO$_2$•gC$_3$N$_4$ (6 h prep. time) | 0.6 | 60 | e |
| hierarchical WO$_3$ | 0 | 0.3 | f |
| hierarchical Bi$_2$O$_3$/WO$_3$ | 0 | 0.9 | f |
| WO$_3$/BiVO$_4$ nanoflakes | 0 | 10 | g |
| [Zn(bpcda)(bdc)]$_n$ MOF | 0-0.9 | 15-31 | This work |

Table references: a: N. Iqbal, I. Khan, Z. H. A. Yamani, A. Qurashi, *Solar Energy* 2017, 144, 604-611; b: J. Du, M. Yang, F. Zhang, X. Cheng, H. Wu, H. Qin, Q. Jian, X. Lin, K. Li, D. J. Kang, *Ceram. Int.* 2018, 44, 3099-3106; c: F. Jiandong, Z. Reza, F. Cristian, S. Alexey, F. Cristina, I. Maria, A. Teresa, M. L. Antonio, A. Jordi, M. Joan Ramon, C. Andreu, *J. Phys. D: Appl. Phys.* 2012, 45, 415301; d: C. W. Ahn, P. H. Borse, J. H. Kim, J. Y. Kim, J. S. Jang, C.-R. Cho, J.-H. Yoon, B.-s. Lee, J.-S. Bae, H. G. Kim, J. S. Lee, *Appl. Catal.*, B 2018, 224, 804-809; e: X. Fan, T. Wang, B. Gao, H. Gong, H. Xue, H. Guo, L. Song, W. Xia, X. Huang, J. He, *Langmuir* 2016, 32, 13322-13332; f: I. Khan, A. Abdalla, A. Qurashi, *Int. J. Hydrogen Energy* 2017, 42, 3431-3439; g: A. A. M. Ibrahim, I. Khan, N. Iqbal, A. Qurashi, *Int. J. Hydrogen Energy* 2017, 42, 3423-3430, each incorporated herein by reference in their entirety.

Figure 5:
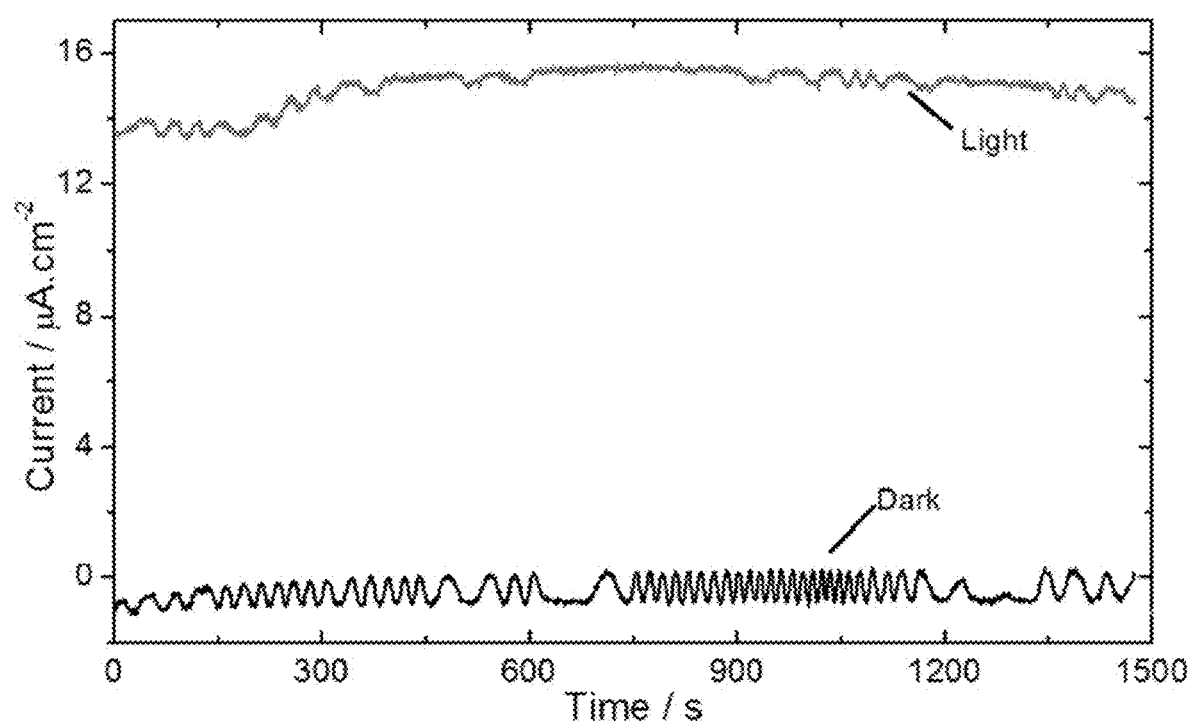
FIG. 5 shows chronoamperometry stability curves of Zn-MOF/FTO photoanode at 0 V (Ag/AgCl/Sat. KCl) and under light and dark conditions.

For demonstrating the practical utility of any photoelectrochemical catalysts, stability is a key factor. Therefore, the stability of [Zn(bpcda)(bdc)]$_n$/FTO photoanode was studied in dark and under 1 sun light illumination (FIG. 5). Remarkably, [Zn(bpcda)(bdc)]$_n$/FTO anode exhibit high stability response over 1500 s of testing time. The dark current was very stable while a noisy photocurrent was observed due to $O_2$ evolution and accumulation of $O_2$ bubbles at the surfaces in case of both the electrodes. See K. Zeng, D. Zhang, Prog. Energy Combust. Sci. 2010, 36, 307-326, incorporated herein by reference in its entirety. A small decrease in photocurrent response was observed over time, which could be recovered once the solution was stirred to remove $O_2$ bubbles from the electrode surface. Thus, [Zn(bpcda)(bdc)]$_n$ photoanode acted as an efficient water oxidation catalyst in neutral sodium sulfate solution. Overall, a reproducible response was observed during the entire experimental time (exceeding 12 h) with a single [Zn(bpcda)(bdc)]$_n$/FTO electrode. The most interesting features observed in the chronoamperometric experiments showed that there were negligible photo-corrosion and good photo-response stability. Consequently, the [Zn(bpcda)(bdc)]$_n$ materials provide promising candidates for anodic water splitting applications.

Example 2

Figure 8:
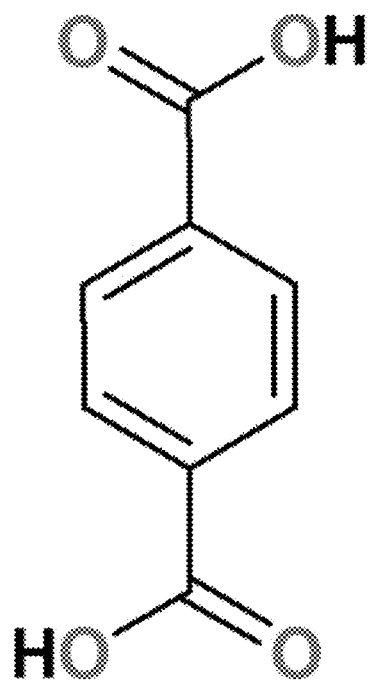
FIG. 8 is the structure of the compound benzene-1,4-dicarboxylic acid ("H$_2$bdc," "bdc," or "terephthalic acid").
Figure 9:
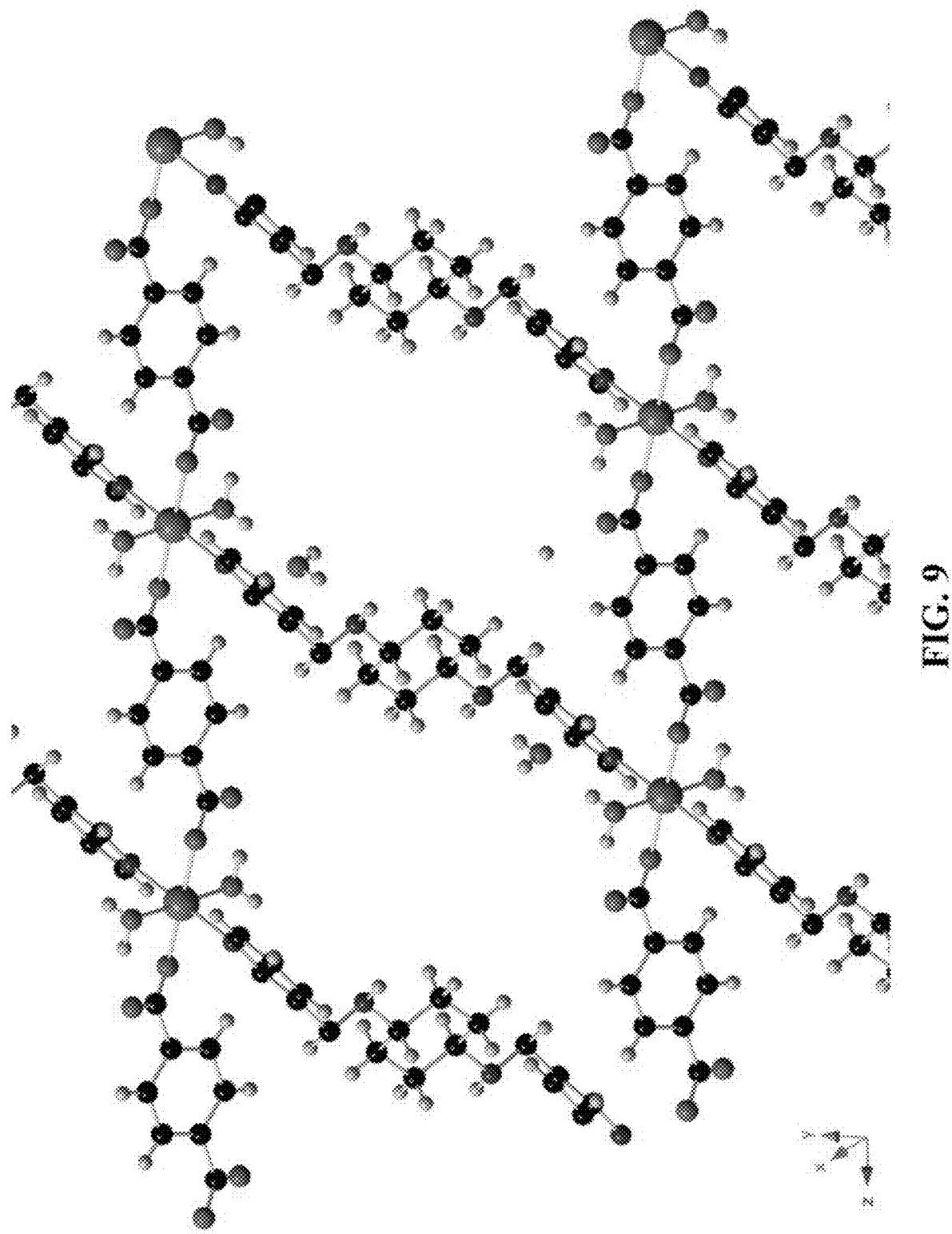
FIG. 9 shows a view of the extended structure of Zn-MOF.

Materials and Methods $Zn(NO_3)_2 \cdot 6H_2O$, terephthalic acid (also "benzene-1,4-dicarboxylic acid" or "bdc," structure shown in FIG. 8), and all reagents and solvents were purchased from Aldrich. These chemicals were used without further purification.

Example 3

Synthesis of N,N'-bis(pyridin-3-ylmethyl)cyclohexane-1,4-diamine ("bpcda")

The synthesis route is diagrammed in FIG. 6. Here, 3-Pyridylcarboxyldehyde (5 g, 46.68 mmol) and (1R,4R)-cyclohexane-1,4-diamine (5.33 g, 46.68 mmol) were added to ethanol (30 mL). Then, triethylamine (7.08 g, 70.02 mmol) was added slowly and refluxed for 4 hrs. Reaction completion was monitored with TLC. Upon completion, the reaction mixture was first cooled to room temperature and then further cooled in an ice bath. $NaBH_4$ (4.41 g, 116.7 mmol) was added in portions and the mixture was stirred overnight at room temperature. 10 mL of water was added to quench the extra reducing agent. Then 40 mL of dichloromethane (DCM) was added and the organic layer was separated and retained. The extraction with DCM was repeated and the organic layers were combined. Anhydrous $Na_2SO_4$ was used to dry the organic solvent. A product yield of 70% was obtained following removal of the solvent by a rotary evaporator.

Example 4

Synthesis of Precursor Metal-Organic Framework (MOF)

$Zn(NO_3)_2 \cdot 6H_2O$ (0.297 g, 1.0 mmol), N,N'-bis(pyridin-3-ylmethylene)cyclohexane-1,4-diamine (3-bpcda) (0.297 g, 1.0 mmol) and $H_2$bdc (0.172 g, 1.0 mmol), (or were mixed in $DMF/H_2O$ (10 mL, v/v: 3/1). The reaction mixture was placed in a glass vial and heated at 105° C. for 72 h. After the vial cooled to room temperature, yellow block-shaped crystals were collected and washed three times with 10 mL DMF. The final product was dried in air at room temperature and used for further studies.

Example 5

Characterization—X-Ray Crystallography

For Zn-MOF single crystal X-ray diffraction data were collected on an Oxford Diffraction Gemini CCD diffractometer employing Cu Kα radiation (1.54180 Å) and operating in the ω-scan mode. Data reduction and empirical absorption corrections (multi-scan) were performed with Oxford Diffraction CRYSALISPRO software Version 1.171.37.35. WINGX program suite was used to solve and refine the structure. See L. J. Farrugia, WinGX suite for small-molecule single-crystal crystallography, Journal of Applied Crystallography, 32 (1999) 837-838, incorporated herein by reference in its entirety. The structure was solved by direct methods with SIR-97 and refined by full-matrix least-squares analysis with SHELXL97. See A. Altomare, M. C. Burla, M. Camalli, G. L. Cascarano, C. Giacovazzo, A. Guagliardi, A. G. Moliterni, G. Polidori, R. Spagna, SIR97: a new tool for crystal structure determination and refinement, Journal of Applied Crystallography, 32 (1999) 115-119; and G. M. Sheldrick, A short history of SHELX, Acta Crystallographica Section A: Foundations of Crystallography, 64 (2008) 112-122, each incorporated herein by reference in their entirety.

Non-hydrogen atoms were refined with anisotropic thermal parameters, whereas H-atoms were included at estimated positions. FIG. 1 of the compound 1 was produced with ORTEP3. See S. Weber, XRDIFF: Simulation of X-ray diffraction patterns, Journal of Applied Crystallography, 30 (1997) 565-566, incorporated herein by reference in its entirety. A summary of the crystal data, structure solution, and refinement parameters are given in Table 5, and selected bond lengths and angles are given in Table 6.

Figure 12:
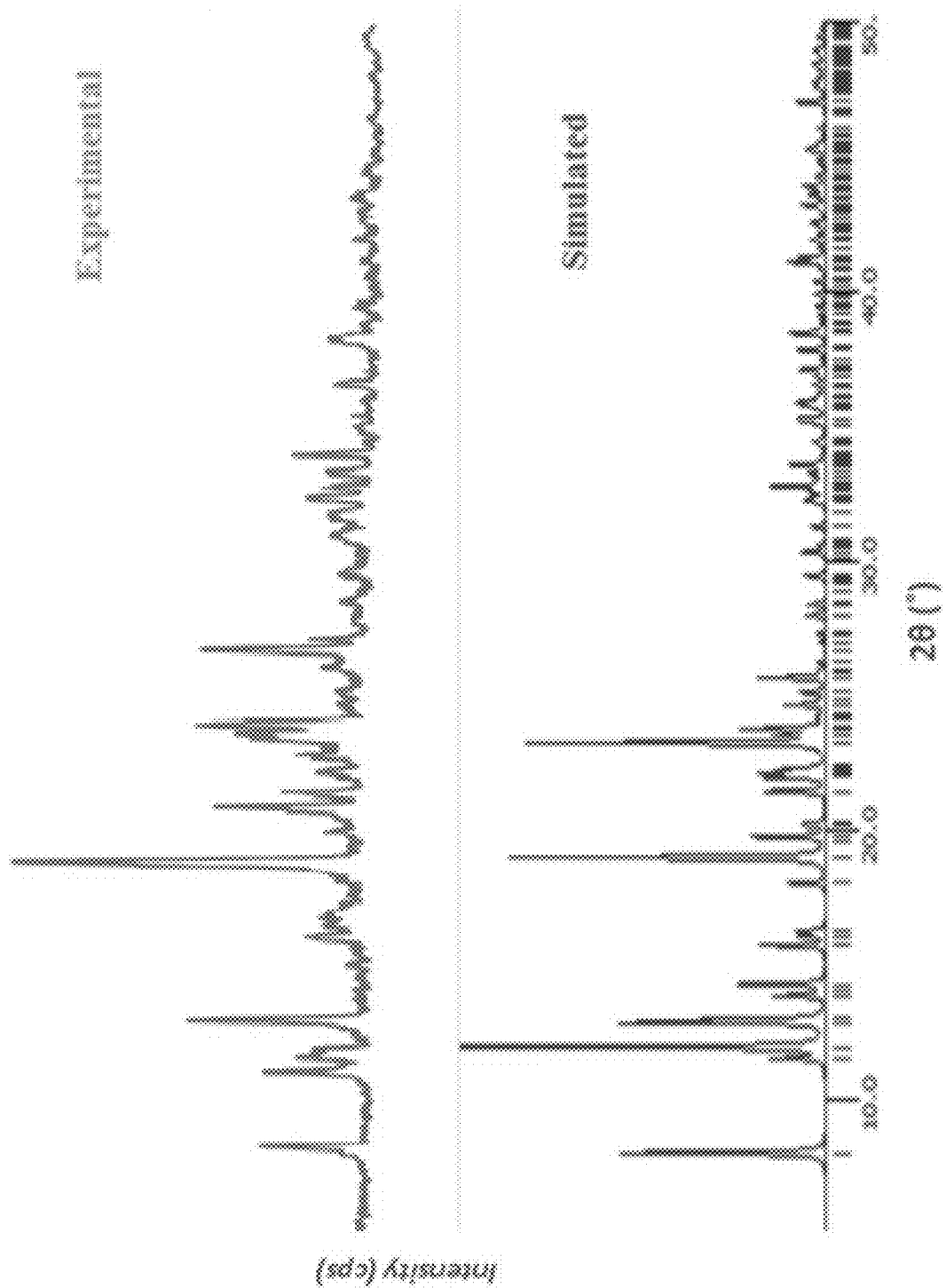
FIG. 12 shows simulated and experimental PXRD patterns of the Zn-MOF.

PXRD of Zn-MOF was measured by Mini-X-ray Diffraction (Mini-XRD) with Cu Kα X-ray radiation source (k=0.15406 nm). The PXRD pattern of Zn-MOF is shown in FIG. 12.

Example 6

Characterization—Elemental Analysis and FT-IR Spectroscopy

Elemental analyses were performed on Perkin Elmer Series 11 (CHNS/O), Analyzer 2400. The solid state FT-IR spectra of the ligands and their Zn(II) MOF were recorded on a Perkin-Elmer FT-IR 180 spectrophotometer or NICOLET 6700 FT-IR using KBr pellets over the range 4000-400 $cm^{-1}$.

Figure 11:
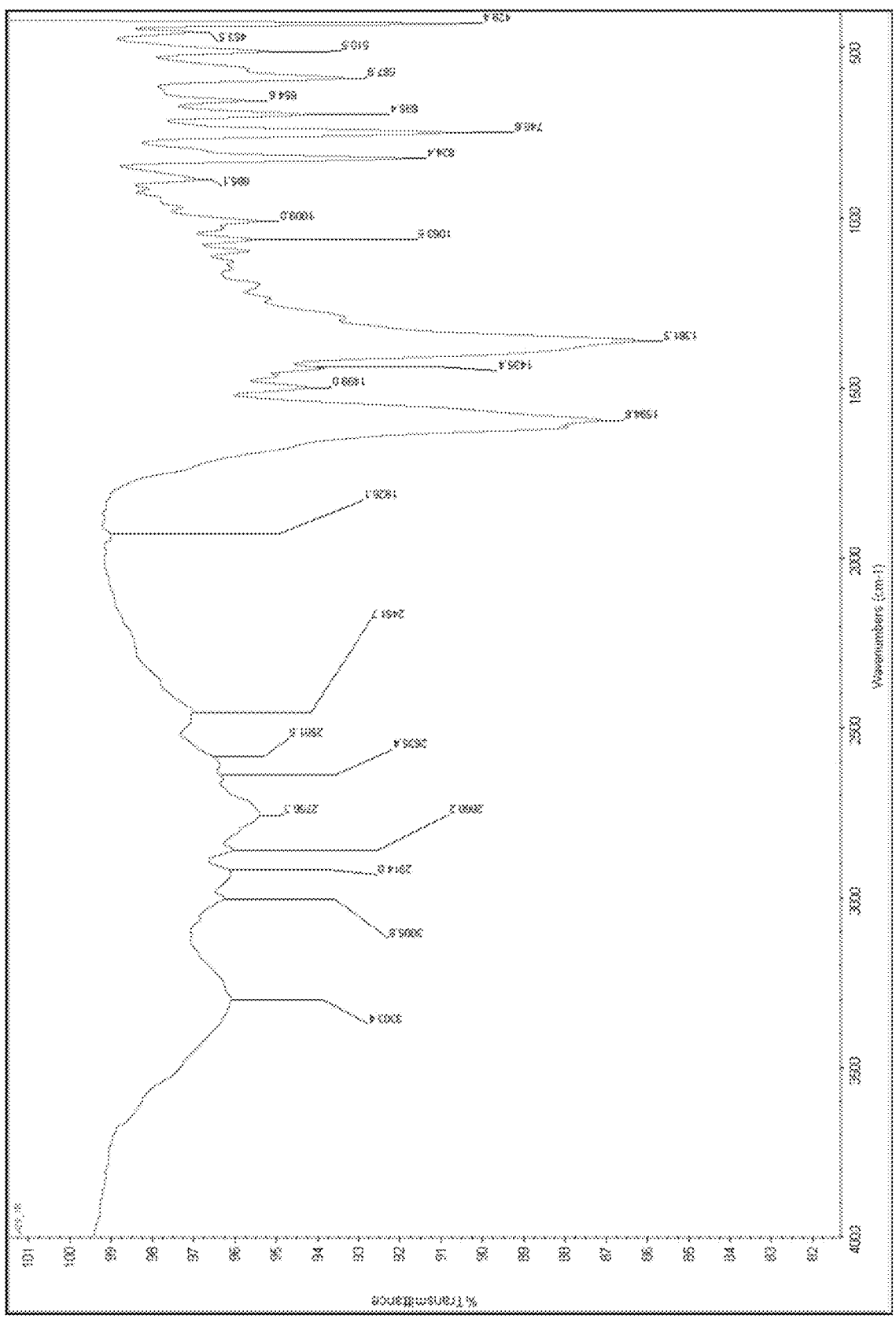
FIG. 11 shows an FT-IR spectrum of Zn-MOF.

The Zn-MOF was characterized by elemental analysis and FT-IR spectroscopy. The CHN elemental analyses results matched well with the calculated results. Anal. Calc. for $C_{13}H_{18}N_2O_4Zn_{0.50}$: C 52.22, H 6.07, N 9.37%. Found; C 52.37, H 6.25, and N 9.77%. FT-IR spectra of Zn-MOF displayed characteristic stretching and absorption bands (FIG. 11), around 3303 (broad) and 1600 $cm^{-1}$ due to the water and N—H stretching (secondary amine) of ligand 3-bpcda and carboxylate group of bdc ligand respectively (Table 2). In addition, the characteristic C—H stretching bands for aromatic and aliphatic functional groups were observed at 3005 and 2914 $cm^{-1}$, respectively. See H.-J. Hao, F.-J. Liu, H.-F. Su, Z.-H. Wang, D.-F. Wang, R.-B.

Huang, L.-S. Zheng, Syntheses, structures and fluorescence of two coordination complexes of Zn (II) and 1,3-bis(2-methylimidazolyl) propane: solvent effect, CrystEngComm, 14 (2012) 6726-6731; D. K. Maity, B. Bhattacharya, R. Mondal, D. Ghoshal, Five diverse bivalent metal coordination polymers based on benzene dicarboxylate and bent dipyridyl ligands: syntheses, structures, and photoluminescent properties, CrystEngComm, 16 (2014) 8896-8909; and W.-G. Yuan, F. Xiong, H.-L. Zhang, W. Tang, S.-F. Zhang, Z. He, L.-H. Jing, D.-B. Qin, Syntheses, structures and luminescent properties of six divalent metal terephthalate coordination polymers based on three new flexible bis(imidazole) ligands, CrystEngComm, 16 (2014) 7701-7710, each incorporated herein by reference in their entirety. The FT-IR spectra and elemental analysis are consistent with the single crystal X-ray structure of Zn-MOF.

TABLE 2

Selected mid-IR frequencies (cm$^{-1}$) of free ligands and Zn-MOF.

| Species | $\upsilon$(C=O) | $\upsilon$(N—H) | $\upsilon$(C—H)$_{aromatic}$ | $\upsilon$(C—H)$_{aliphatic}$ |
|---|---|---|---|---|
| 1,4-bdc and 3-bpcda | 1705.8 | 3335.2, 743.8 | 3055.7, 3029.8 | 2928.5, 2856.1 |
| Zn-MOF | 1594.6 | 3305.8, 748.6 | 3005.8 | 2914.0 |

Example 7

Characterization—NMR Spectroscopy $^1$H and $^{13}$C NMR spectra were recorded on a LAMBDA 500 spectrophotometer operating at 500.01, 125.65 and 200.0 MHz respectively; corresponding to a magnetic field strength of 11.74 T. Tetra-methylsilane (TMS) was used as an internal standard for $^1$H and $^{13}$C NMR measurements. The $^{13}$C NMR spectra were obtained with $^1$H broadband decoupling, and the spectral conditions were: 32 k data points, 0.967 s acquisition time, 1.00 s pulse delay, and 45° pulse angle. The $^1$H and $^{13}$C NMR chemical shifts are given in Tables 3 and 4, respectively. The appearance of chemical shifts for N—H (Amine), C=O (Carbonyl), Ph (Phenyl), Cy (Cyclohexyl), —CH$_2$— (Methylene) and Py (Pyridyl) groups of both ligands in $^1$H and $^{13}$C NMR spectra of compound 1 is consistent with the single crystal X-ray structure.

TABLE 3

$^1$H chemical shifts (ppm) of the Zn-MOF in DMSO-d$_6$.

| N—H | —CH$_2$— | Cy | Py | Ph |
|---|---|---|---|---|
| 5.35 | 4.36 | 3.00, 3.39, 3.65 | 8.69, 9.25 | 9.68 |

TABLE 4

$^{13}$C chemical shifts (ppm) of Zn-MOF in DMSO-d$_6$.

| C=O | —CH2— | Cy | Py | Ph |
|---|---|---|---|---|
| 153.05 | 48.57 | 29.48, 55.37 | 127.75, 141.88 | 130.18 |

The synthesis of novel zinc-based metal-organic framework is reported. The X-ray structure analysis displayed that [Zn(bpcda)(bdc)]$_n$ is a three-dimensional (3D) framework that contains 1,4-bdc and bpcda linkers. In this structure, each bdc anion connects with a metal center in a bridging mode, resulting in 1D chains that are linked by a bipyridyl bpcda linker to form three-dimensional diamondoid framework. The application of this novel MOF for photoelectrochemical water splitting has been demonstrated. PEC measurements with this MOF displayed photocurrent density in microampere range with negligible photo-corrosion and appreciable stability. The LSV and CV studies demonstrated oxygen evolution as a result of solar driven water splitting reaction. This shows that MOFs may be tuned for direct PEC water splitting and other electrochemical applications without supported nanostructures.

TABLE 5

Crystal data and structure refinement details of Zn-MOF.

Crystal data

| | |
|---|---|
| Chemical formula | $C_{26}H_{28}N_4O_4Zn$ |
| Molecular weight | 525.89 |
| Crystal system, space group | Monoclinic, C 2/c |
| Temperature (K) | 190 |
| a, b, c (Å) | 18.9102 (4), 6.1743 (2), 20.0362 (4) |
| β (°) | 95.453 (2) |
| V (Å$^3$) | 2328.78 (10) |
| Z | 4 |
| Radiation type | Cu Kα |
| μ (mm$^{-1}$) | 1.81 |
| Crystal size (mm) | 0.1 × 0.04 × 0.04 |
| Absorption correction | Multi-scan |
| T$_{min}$, T$_{max}$ | 0.993, 1.000 |
| No. of measured, independent and observed [I > 2σ(I)] reflections | 4516, 1847, 1722 |
| R$_{int}$ | 0.021 |
| (sin θ/λ)$_{max}$ (Å$^{-1}$) | 0.575 |
| R[F$^2$ > 2σ(F$^2$)], wR(F$^2$), S | 0.025, 0.065, 1.06 |
| No. of reflections | 1847 |
| No. of parameters | 215 |
| Largest diff. Peak and hole (e Å$^{-3}$) Δρ$_{max}$, Δρ$_{min}$ (e Å$^{-3}$) | 0.23, −0.27 |

TABLE 6

Selected bond lengths (Å) and bond angles (°) of Zn-MOF.

| Bond length(Å) | | Bond angles (°) | |
|---|---|---|---|
| Zn1 —O1 | 1.959 (1) | O1 —Zn1 —O1$^i$ | 100.77 (8) |
| Zn1 —N1 | 2.048 (1) | O1 —Zn1 —N1 | 125.37 (5) |
| | | O1 —Zn1 —N1$^i$ | 103.32 (6) |
| | | N1 —Zn1 —N1$^i$ | 101.21 (8) |

The invention claimed is:

1. A zinc-based metal organic framework (Zn-MOF), comprising:
   Zn$^{2+}$ ion centers,
   wherein each Zn$^{2+}$ ion center is coordinated in a distorted tetrahedral geometry with a total of four linkers, the four linkers comprising:
      two diamine linkers of N,N'-bis(pyridin-3-ylmethylene)cyclohexane-1,4-diamine, and
      two dicarboxylic acid linkers of benzene-1,4-dicarboxylic acid,
   wherein each Zn$^{2+}$ ion center is linked to each diamine linker through a N atom and linked to each dicarboxylic acid linker through a carboxylic acid group.

2. The Zn-MOF of claim 1, wherein the Zn$^{2+}$ ion centers are linked together by the linkers in a diamondoid framework.

3. The Zn-MOF of claim 2, which has a five-fold interpenetrating diamondoid framework.

4. The Zn-MOF of claim 1, wherein the aromatic heterocyclic groups define planes that are substantially parallel with each other.

5. The Zn-MOF of claim 1, wherein an average Zn—Zn spacing across either linker is in a range of 10-18 Å.

6. The Zn-MOF of claim 1, wherein an average Zn bond angle is in a range of 105-115°.

7. The Zn-MOF of claim 1, which has an ultraviolet visible absorption with an absorbance maximum in a range of 280-400 nm.

8. The Zn-MOF of claim 1, which has a monoclinic crystal system with a C2/c space group.

9. The Zn-MOF of claim 1, wherein a cyclohexane group of the diamine linker is in chair conformation.

10. A photoelectrochemical cell, comprising:
    a photoelectrode comprising the Zn-MOF of claim 1 deposited on a metal oxide conducting substrate;
    a counter electrode; and
    an aqueous electrolyte solution in contact with both electrodes.

11. The photoelectrochemical cell of claim 10, wherein the photoelectrode has a current density of 15-40 $\mu A/cm^2$ when the electrodes are subjected to a bias potential of 0.05-1.0 V and an illumination of 80-150 $mW/cm^2$.

12. The photoelectrochemical cell of claim 10, which does not comprise a sacrificial oxidant.

13. A method of photoelectrochemical water splitting, comprising:
    irradiating the electrochemical cell of claim 10 with sunlight.

* * * * *